(12) United States Patent
Stoltenberg

(10) Patent No.: US 11,341,758 B1
(45) Date of Patent: May 24, 2022

(54) IMAGE PROCESSING METHOD AND SYSTEM

(71) Applicant: Sprout.ai Limited, Swansea (GB)

(72) Inventor: Niclas Stoltenberg, Swansea (GB)

(73) Assignee: Sprout.ai Limited, Swansea (GB)

( * ) Notice: Subject to any disclaimer, the term of this patent is extended or adjusted under 35 U.S.C. 154(b) by 0 days.

(21) Appl. No.: 17/396,390

(22) Filed: Aug. 6, 2021

(30) Foreign Application Priority Data

May 7, 2021 (GB) .................................... 2106569

(51) Int. Cl.
*G06V 30/32* (2022.01)
*G06K 9/62* (2022.01)
*G06N 3/08* (2006.01)
*G06N 3/04* (2006.01)
*G06V 10/22* (2022.01)
*G06V 30/148* (2022.01)

(52) U.S. Cl.
CPC ......... *G06V 30/333* (2022.01); *G06K 9/6256* (2013.01); *G06N 3/04* (2013.01); *G06N 3/08* (2013.01); *G06V 10/22* (2022.01); *G06V 30/153* (2022.01)

(58) Field of Classification Search
CPC ...... G06K 9/0061; G06K 9/46; G06K 9/6256; G06K 2209/01; G06V 30/153; G06V 30/333; G06V 10/22; G06V 30/10; G06V 10/40; G06V 40/193; G06N 3/04; G06N 3/08
See application file for complete search history.

(56) References Cited

U.S. PATENT DOCUMENTS

| 2008/0008383 A1* | 1/2008 | Andel ...................... G06K 9/00 382/173 |
| 2021/0004584 A1* | 1/2021 | Bildner ................ G06K 9/6256 |
| 2021/0073514 A1* | 3/2021 | Sangala ............... G06K 9/6202 |

OTHER PUBLICATIONS

Computer English Translation of Chinese Patent document No. CN 111553423 A, pp. 1-10. (Year: 2020).*
Computer English Translation of Chinese Patent document No. CN 109344309 A, pp. 1-17. (Year: 2019).*
Zhou et al. "EAST: An Efficient and Accurate Scene Text Detector," arXiv, Jul. 10, 2017—10 pages.
Baek et al., Character Region Awareness for Text Detection, arXiv, Apr. 3, 2019—12 pages.
Liao et al., "Real-time Scene Text Detection with Differentiable Binarization." Association for the Advancement of Artificial Intelligence, Dec. 3, 2019—8 pages.
Ye et al., "TextFuseNet: Scene Text Detection with Richer Fused Features," Proceedings of the Twenty-Ninth International Joint Conference on Artificial Intelligence (IJCAI-20)—7 pages.
Shi et al., "An End-to-End Trainable Neural Network for Image-based Sequence Recognition and Its Application to Scence Text Recognition," arXiv, Jul. 21, 2015—9 pages
Li et al., "Show, Attend and Read: A Simple and Strong Baseline for Irregular Text Recognition," arXiv, Mar. 16, 2019—9 pages.

(Continued)

*Primary Examiner* — Daniel G Mariam
(74) *Attorney, Agent, or Firm* — Dority & Manning, P.A.

(57) ABSTRACT

A computer implemented method of processing an image, comprising:
  obtaining an input image;
  converting the input image into a binary image;
  processing the binary image using a first trained model that performs classification of image components as part of a character.

18 Claims, 23 Drawing Sheets
(2 of 23 Drawing Sheet(s) Filed in Color)

(56) References Cited

OTHER PUBLICATIONS

Cai et al., "Revisiting Classification Perspective on Scene Text Recognition," arXiv, Apr. 6, 2021—12 pages.
HYPERSCIENCE: Redefining Enterprise Automation, 2021 Hyper Labs Inc.,—https://hyperscience.com/—6 pages.
INDICO: AI-powered Intelligent Process Automation for Unstructured Content Analysis, Indico Data Solutions, Inc, https://indico.io/product/—5 pages.
Teng et al., "Invertible Autoencoder for Domain Adaptation," Computation 2019, 7, 20, MDPI, Mar. 27, 2019—21 pages.
SPROUT.ai, "Sprout.ai making big steps in OCR," https://sprout.ai/sprout/sprout-ai-making-big-steps-in-ocr/, Jul. 17, 2020—2 pages.
Xing et al., "Convolutional Character Networks," arXiv, Oct. 17, 2019—10 pages.
Ballard, "Generalizing the Hough Transform to Detect Arbitrary Shapes," Computer Science Department—University of Rochester, Sep. 23, 1980—12 pages.
Jo et al., "Handwritten Text Segmentation in Scribbled Document via Unsupervised Domain Adaptation," Proceedings of APSIPA Annual Summit and Conference 2019, Abstract Only, Nov. 18-21, 2019—3 pages.
Otsu, "A Treshold Selection Method from Gray-Level Histograms," IEEE Transactions on Systems, Man, and Cybernetics, vol. 9, Issue: 1, Jan. 1979—5 pages.
MMOCR, OpenMMLab Text Detection, Recognition and Understanding Toolbox, GitHub, Inc., 2021, https://github.com/open-mmlab/mmocr—2 pages.
PADDLEOCR, Awesome multilingual OCR toolkits based on PaddlePaddle, GitHub, Inc., 2021, https://github.com/PaddlePaddle/PaddleOCR—4 pages.
TESSERACT, Tesseract Open Source OCR Engine, GitHub, Inc., 2021, https://github.com/tesseract-ocr/tesseract—2 pages.
CRNN CLOVAAI, Text Recognition (Optical Character Recognition) with Deep Learning Methods, GitHub, Inc., 2021, https://github.com/clovaai/deep-text-recognition-benchmark—3 pages.

\* cited by examiner

Figure 6(b)

ALFA ROMEO

CARPO Y

BMW 348 audi A5

Volkswagen skoda Road

Citroen Berlingo

Mercedes B

DAF XF

Figure 8(b)

Audio Bosco

Tokpo 4 xxx 218

Qual'05

Volkswagen xxxx xxx xxxx Berlin

Mercedes B

DMF xF

Figure 12(b)

ALFA_ROMEO

CORPO Y

BMW 318

Audi A5

Volkswagen

Skoda Rapid

Citroen Berlingo

Mercedes B

DAF XF

Mark type
ALFA ROMEO

Mark type
CORPO 4

Mark type
BMW 318

Marque, type
Audi A5

Mark type
Volkswagen

Marque type
Skoda PoAd

Marque type
Citroen Berlingo

Merk typ
Mercedes B

Mark typo
DAF XF

Figure 14(b)

IMAGE PROCESSING METHOD AND SYSTEM

CROSS REFERENCE TO RELATED APPLICATIONS

This application claims the benefit of UK patent application 2106569.3 filed 7 May 2021 which is incorporated by reference herein.

FIELD

The present invention relates to a computer-implemented method of processing an image and a system for processing an image. In particular, the present invention relates to methods and systems for processing an image to perform optical character recognition.

BACKGROUND

Optical character recognition is a process of converting images of text into character code data. Optical character recognition has application in many different fields. For example, optical character recognition may be used as part of a data entry process, in which scanned images of text are converted to machine readable text which can then be electronically searched, stored or edited for example. There is a continuing need to improve the accuracy of optical character recognition systems.

BRIEF DESCRIPTION OF FIGURES

The patent or application file contains a least one drawing executed in color. Copies of this patent or patent application publication with color drawing(s) will be provided by the Office upon request and payment of the necessary fee.

Systems and methods in accordance with non-limiting embodiments will now be described with reference to the accompanying figures in which:

FIG. 6(b) shows example images output from the first model of FIGS. 5 and 6(a);

FIG. 8(b) shows example ages output from the model of FIGS. 7 and 8(a);

FIG. 12(b) shows example images output from the first model of FIGS. 9, 10, 11 and 12(a);

FIG. 14(b) shows example images output from the model of FIGS. 13 and 14(a);

DETAILED DESCRIPTION

Figure 1:
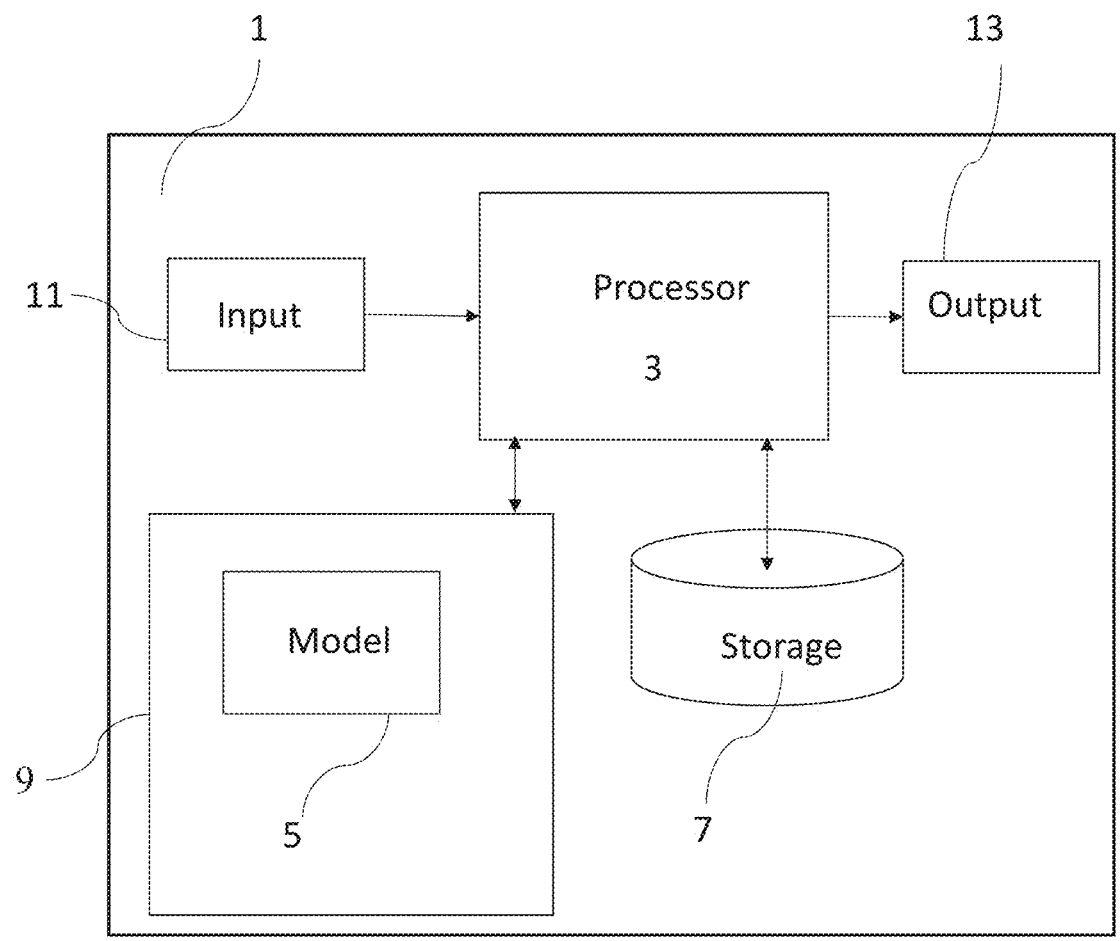
FIG. 1 shows a schematic illustration of a system in accordance with an embodiment.

According to one aspect, there is provided a computer implemented method of processing an image, comprising:
  obtaining an input image;
  converting the input image into a binary image;
  processing the binary image using a first trained model that performs classification of image components as part of a character.

According to another aspect, there is provided a computer implemented method of processing an image, comprising:
  obtaining an input image;
  converting the input image into a binary image;
  processing the binary image to isolate the handwritten characters using a first trained model.

The image components may be pixels. The first trained model generates a processed binary image in which each pixel is classified as part of a handwritten character or not part of a handwritten character.

In an embodiment, the method further comprises performing optical character recognition using the processed binary image. The optical character recognition may use a second trained model, wherein the second trained model comprises one or more convolutional layers.

In an embodiment, the first model comprises a first section and a second section, wherein the binary image is inputted to the first section, wherein the first section comprises a first set of convolutional layers and wherein the second section comprises a second set of convolutional layers, wherein the first set of convolutional layers comprises an increasing number of filters and wherein the second set of convolutional layers comprises a decreasing number of filters.

In an embodiment, the size of the data output from the first section is greater than the size of the binary image data.

In an embodiment, the first model further comprises one or more skip connections within the first section and/or one or more skip connections within the second section.

According to another aspect, there is provided a system, comprising one or more processors configured to:
  obtain an input image;
  convert the input image into a binary image;
  process the binary image using a first trained model that is configured to perform classification of image components as part of a character.

According to another aspect, there is provided a system, comprising one or more processors configured to:
  obtain an input image;
  convert the input image into a binary image;
  process the binary image to isolate the handwritten characters using a first trained model.

According to another aspect, there is provided a computer implemented method of training a first model, the method comprising:
  obtaining an input binary image;
  processing the binary image using a first model that performs classification of image components as part of a character;
  updating one or more parameters of the first model based on a target image in which the image components are indicated as part of a character or not part of a character.

According to another aspect, there is provided a computer implemented method of training a first model, the method comprising:
  obtaining an input binary image;
  processing the binary image using a first model that isolates the handwritten characters;
  updating one or more parameters of the first model based on a target image in which the handwritten characters are isolated.

In an embodiment, the first model generates a processed binary image in which each pixel is classified as part of a handwritten character or not part of a handwritten character.

In an embodiment, the first model comprises a first section and a second section, wherein the input binary image is inputted to the first section, wherein the first section comprises a first set of convolutional layers and wherein the second section comprises a second set of convolutional layers, wherein the first set of convolutional layers comprises an increasing number of filters and wherein the second set of convolutional layers comprises a decreasing number of filters.

In an embodiment, the size of the data output from the first section is greater than the size of the input binary image data.

In an embodiment, the first model her comprises a dropout layer between the first section and the second section.

In an embodiment, the first model further comprises one or more skip connections within the first section and/or one or more skip connections within the second section. None of the skip connections connect between the first section and the second section.

In an embodiment, obtaining the input binary image comprises processing the target image to add one or more of the following features: noise, machine written text and lines.

According to another aspect, there is provided a computer implemented method of processing an image, comprising:
  obtaining an input image;
  converting the input image into a binary image;
  processing the binary image using a first model, wherein the first model is trained according to any of the above described methods.

According to another aspect, there is provided a system, comprising a first model trained according to any of the above methods.

According to another aspect, there is provided a carrier medium comprising computer readable code configured to cause a computer to perform any of the above methods.

According to another aspect, there is provided a non-transitory computer readable storage medium comprising program instructions stored thereon that are executable by a computer processor to perform any of the above described methods. The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to a further aspect, there is provided a carrier medium comprising computer readable code configured to cause a computer to perform any of the above described methods.

FIG. 1 shows a schematic illustration of a system 1 in accordance with an embodiment. The system 1 comprises an input 11, a processor 3, a working memory 9, an output 13, and storage 7. The system 1 takes an input image and generates an output. The input image data may be received as a PNG file or a JPEG file for example. The input image is an image of one or more characters in handwritten text. The output comprises machine readable text, comprising character code data. The output may comprise plain text or a file of character codes. The output may comprise a TXT or DOC file for example.

The system 1 is a computing system. It may be an end-user system such as a mobile device or personal computer, or a server for example.

The processor 3 is coupled to the storage 7 and accesses the working memory 9. The processor 3 may comprise logic circuitry that responds to and processes the instructions in code stored in the working memory 9. Although a single processor 3 is shown in the figure, it is to be understood that the system 1 may comprise two or more processors, which may be located in the same system 1 or be located remotely, and be configured to perform different parts of the processing and transmit data between them. For example, the system 1 may comprise a graphical processing unit (GPU) and a general central processing unit (CPU), where various operations are implemented by the GPU, and other operations are implemented by the CPU. For example, matrix operations may generally be performed by the GPU.

A computer program 5 is stored in storage 7. The storage 7 is accessed by the processor 3 and the stored code 5 is retrieved and executed by the processor 3. In particular, when executed, computer program code 5 embodying the methods described below is represented as a software product stored in the working memory 9, as illustrated in the figure. Execution of the code 5 by the processor 3 will cause embodiments as described herein to be implemented.

The processor 3 also accesses the input module 11 and the output module 13. The input and output modules or interfaces 11, 13 may be a single component or may be divided into a separate input interface 11 and a separate output interface 13.

The input module 11 is connected to an input 15 for receiving the image data. The input 15 may be a receiver or port for receiving data from an external storage medium or through a communication network. Alternatively, the input 15 may comprise hardware such as an image capturing apparatus. The input image may be stored in storage 7.

Connected to the output module 13 is output 17. The output 17 may comprise hardware, such as a display component. Alternatively, the output may be a transmitter or port for transmitting data to an external storage medium or through a communication network. The output 17 may write data in a stored file, which may be stored on the system 1 or on a separate storage medium such as a CD ROM, a magnetic device or a programmable memory device.

The storage 7 is communicatively coupled with the processor 3. The storage 7 may contain data that is used by the code 5 when executed by the processor 3. As illustrated, the storage 7 is local memory that is contained in the device. Alternatively however, the storage 7 may be wholly or partly located remotely, for example, using cloud based memory that can be accessed remotely via a communication network (such as the Internet). The code 5 is also stored in the storage 7. The code 5 is placed in working memory 9 when executed.

The system 1 may be located in a common system with hardware for inputting and outputting data. Alternatively, the system 1 may be a remote system 1, which receives image data transmitted from a separate unit (for example an image capturing device), and transmits output data to another separate unit (for example a user computer comprising a screen). For example, the system may be implemented on a cloud computing system, which receives and transmits data.

Usual procedures for the loading of software into memory and the storage of data in the storage unit 7 apply. The code 5 can be embedded in original equipment, or can be provided, as a whole or in part, after manufacture. For instance, the code can be introduced, as a whole, as a computer program product, which may be in the form of a download, or can be introduced via a computer program storage medium, such as an optical disk. Alternatively, modifications to existing dialogue manager software can be made by an update, or plug-in, to provide features of the described embodiments.

While it will be appreciated that the described embodiments are applicable to any computing system, the example computing system illustrated in FIG. 1 provides means capable of putting an embodiment, as described herein, into effect.

In use, the system 1 receives image data through data input 11. The program 5, executed on processor 3, outputs data through the output 13 in the manner which will be described with reference to the following figures. The processor 3 may comprise logic circuitry that responds to and processes the program instructions.

The system is used to perform optical character recognition. Optical character recognition is a process of converting images of text into machine readable text. Optical character recognition has application in many different fields. For example, optical character recognition may be used as part of a data entry process, in which scanned images of handwritten text are converted to machine readable text which can then be electronically searched, stored or edited for example.

There are various different approaches to optical character recognition. A first approach is based on template matching, in which the input character image is compared with a set of stored template character images on a pixel-by-pixel basis. Each stored template image corresponds to a different character. The template which is the closest match to the input character image is returned as the recognised character. A second approach is based on feature extraction and classification. A feature extraction algorithm extracts features of the character image, for example, lines and closed loops. A classifier then uses the extracted features to determine the character which is the best match. The classifier may be based on a K nearest neighbour algorithm or a feed forward neural network for example. In these approaches, various image pre-processing steps are performed before the template matching or feature extraction and classification process. The image pre-processing steps may include processes such as scaling, de-skewing, de-noising and binarisation for example. In many cases, for example where the input image comprises handwritten text to be identified, a large number of characters may be misidentified, and a low accuracy is obtained.

A third approach takes the image data (pixel data) directly as input into a machine learning model, for example, a convolutional neural network. Generally, the machine learning model used in this third approach is a deep learning model, comprising multiple layers. Such approaches generally provide improved accuracy in cases where the input image comprises handwritten text to be identified. However, in many data entry applications, the image may comprise handwritten text which it is desired to convert to machine encoded text, as well as various other features of the form into which the handwritten text was originally entered. These other features may include machine written text, lines, boxes or shading for example. Furthermore, these features may overlap with the handwritten text. In such cases, the accuracy of optical character recognition performed using the third approach may be lower.

In embodiments described herein, a computer implemented method of processing an image is provided. An input image is pre-processed before optical character recognition is performed using the pre-processed image. The optical character recognition is performed using the third approach—in other words, the image data (pixel data) of the pre-processed image is taken directly into a trained model. The pre-processing stage comprises converting the image to a binary image and processing the binary image to isolate handwritten characters using a first trained model. The first trained model performs classification of image components as part of a character. The image components may be pixels. The first trained model processes the binary image to indicate pixels which correspond to characters that resemble handwritten characters.

These pixels are distinguished from the other pixels in the processed image. The pre-processed image is a binary image, in which one category corresponds to a pixel which is identified by the first trained model as corresponding to a handwritten character in the input image, and the other category corresponds to a pixel which is identified by the first trained model as not corresponding to a handwritten character in the input image. The first trained model performs a binary classification, and generates a binary image in which each pixel is classified as part of a handwritten character or not part of a handwritten character. The classification model acts to identify characters that were written by a person or were written by a machine in a font or style that resembles characters written by a person. The pre-processing stage removes various image features which can lead to lower accuracy in an optical character recognition process performed according to the third approach, including for example machine written text, lines or shading for example. In this manner, improved accuracy of the optical character recognition process may be obtained.

Figure 2A:
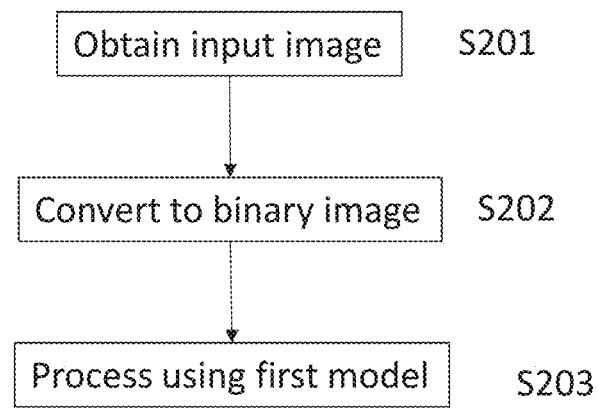
FIG. 2(a) is a schematic illustration of a method of processing an image in accordance with an embodiment.

FIG. 2(a) is a schematic illustration of a method of processing an image in accordance with an embodiment. The method may be implemented on a system such as described in relation to FIG. 1.

Figure 3A:
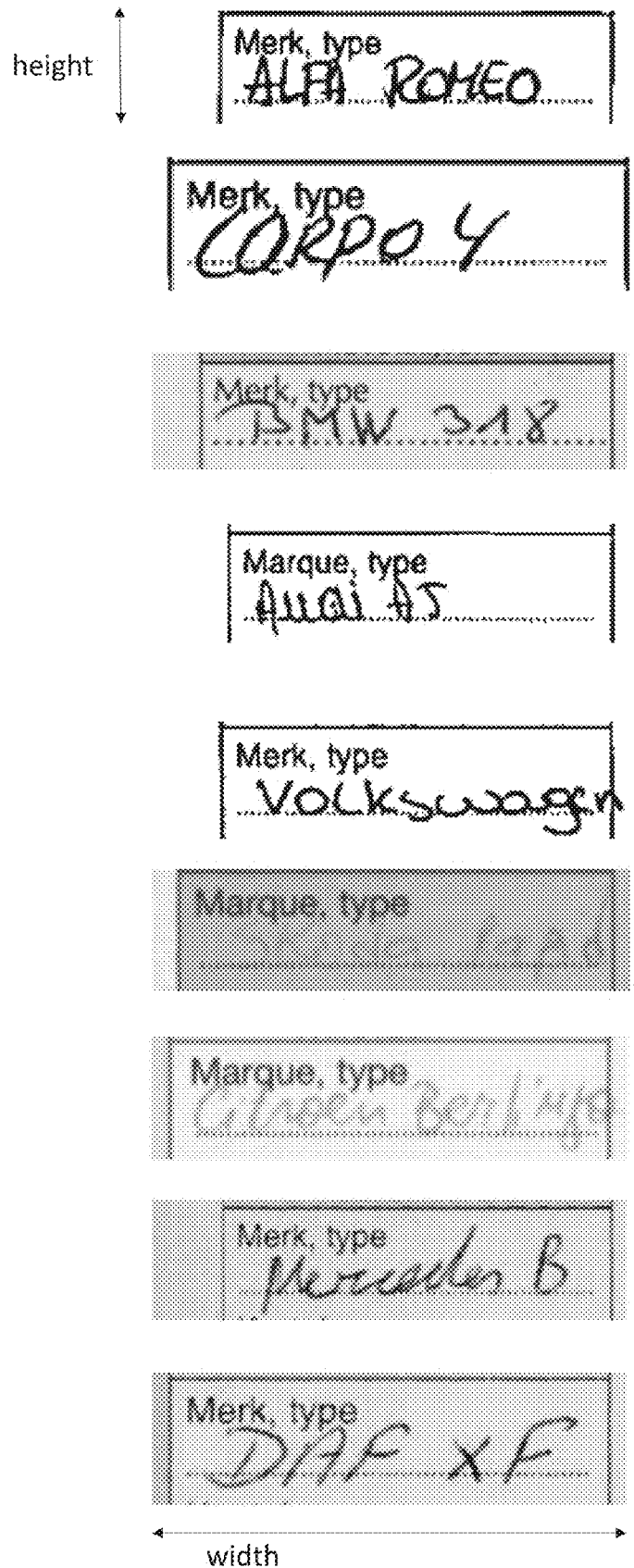
FIG. 3(a) shows example input images.

In S201, an input image is obtained. The input image comprises one or more characters in handwritten text. FIG. 3(a) shows nine example input images. The input images in this example are images of a section of a motor insurance claim form.

As shown in FIG. 3(a), as well as the handwritten text, the input images comprise other features, including machine written text, lines, dirt or marks on the paper, and background colour or shading. All of the example images shown in FIG. 3(a) comprise some machine written text, for example "Merk, type" or "Marque, type" in addition to the handwritten text, which in these examples is the type of car (ALFA ROMEO, CORPO 4, BMW 318, Audi A5, etc). The images also comprise a dashed line under the handwritten text, and an outline box around the text. Some of the images comprise background shading or colour. The images also comprise noise, such as artefacts of an image scanning process for example.

The input image comprises a plurality of pixels. The input image data therefore comprises a plurality of pixel values. In this example, each image is 64×256 pixels. As illustrated in FIG. 3(a), each input image is 64 pixels in height and 256 pixels in width. Thus the input image data comprises 64×256 pixels. Although in this example, the input images are all the same size, where images of different size are to be processed, an initial step of re-scaling may be included. This may include zero-padding of the images at the edges where the input image is smaller for example. This may include applying a convolutional filter where the input image is larger for example.

The images may be grayscale images or colour images for example. For grayscale images, each pixel corresponds to a single number. For example, each pixel value is an integer from 0 to 255. For colour images, separate red, green and blue components may be specified for each pixel for example, with each pixel corresponding to a vector of three numbers for example.

In S202, the input image is converted to a binary image. In a binary image, each pixel value is a single number, which is either 1 or 0.

In step S202, a binarisation process is performed on the image. This step may comprise performing an adaptive thresholding process for example. The image may be binarized with a histogram-based thresholding method. An example is described here which uses a histogram-based thresholding method, however various methods of binarising an image are known and are suitable for use in S202.

In this step, if the input image is a colour image, it is first converted to a grayscale image. Various methods are suitable for converting a colour image to a grayscale image and are known in the art. For example, a weighted sum of red, green, and blue pixel values may be taken to give the grayscale pixel value for a given pixel in the image.

Prior to performing the binarisation process, the grayscale image is first filtered with a Gaussian smoothing kernel to remove noise. A convolution between a Gaussian smoothing kernel and the grayscale image is performed. Multiple Gaussian smoothing kernels of different size may be applied, and an average value for each pixel taken. As shown in FIG. 3(a), some input images may have relatively faint handwritten text, for example the sixth example input image. For such images, applying a relatively larger Gaussian kernel improves the model performance. However, other images, such as the second example input image, have relatively stronger handwritten text. By applying different Gaussian smoothing kernels to different copies of the grayscale image, and taking the average value from the smoothed images for each pixel, the model performance can be made more robust to variations in image contrast.

The binarisation process is performed on the grayscale image data, which comprises a value from 0 to 255 for each pixel in the image in this case. In this binarisation process, each pixel value is replaced with a value 1 if the pixel value is greater than some threshold T and a value 0 if the pixel value is less than the threshold. The threshold T is determined for each input image using a histogram-based method such as Otsu's method, in which the threshold is determined by maximizing inter-class variance, with the classes being 1 and 0.

In this method, the number of pixels in the image corresponding to each intensity level is first determined. In this example, the intensity levels correspond to the pixel values from 0 to 255. However, fewer than 256 histogram bins may be used for example. The probability P(i) of each intensity level i is then determined from:

$$P(i) = \frac{n_i}{n}$$

where n is the number of pixels in the image, and $n_i$ is the number of pixels having a pixel value i in the image, where i is from 0 to 255 in this example.

For each possible threshold value t from 0 to 255, the class probabilities are calculated from:

$$w_0(t) = \sum_{i=0}^{t-1} P(i)$$

$$w_1(t) = \sum_{i=t}^{255} P(i)$$

The class means are then calculated from:

$$\mu_0(t) = \frac{\sum_{i=0}^{t-1} iP(i)}{w_0(t)}$$

$$\mu_1(i) = \frac{\sum_{i=t}^{255} iP(i)}{w_1(t)}$$

The inter-class variance is then calculated from:

$$\sigma_b^2(t) = w_0(t)w_1(t)[\mu_0(t) - \mu_1(t)]^2$$

The value of t corresponding to the maximum $\sigma_b^2(t)$ is then selected as the threshold T for the image. All pixels having pixel values below T are set to 0, and all pixels having pixel values of T or greater are set to 1.

Various modifications or extensions can be made to the above method. Alternative histogram based methods, such as triangle thresholding may alternatively be used.

A binary image is output from S202. Using binary images as input to the first trained model means there is less variation between possible input images. This means that a training dataset which is representative of the expected data is easier to obtain—for example, it may be possible to use synthetic training data to train the first model, and still obtain good performance.

As described above, a binary image is output from S202. The binary image comprises 64×256 pixel values, each being 0 or 1 in this example.

In S203, the binary image is processed to isolate the handwritten characters using a first trained model 40. In this example, pixels corresponding to parts of the image which are not handwritten characters are set or maintained to 1, whilst the pixels corresponding to the handwritten characters are set or maintained at 0.

Figure 3B:
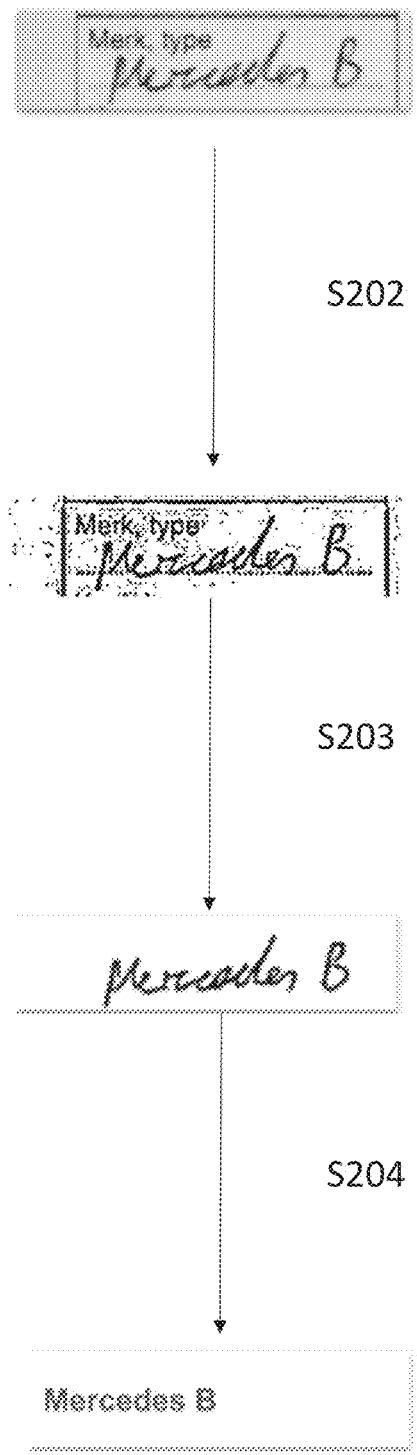
FIG. 3(b) is a schematic illustration showing example outputs at various stages of a method in accordance with an embodiment.

FIG. 3(b) is a schematic illustration showing the generated images at various stages of the methods shown in FIGS. 2(a) and (b). The top image is the input image. The input image comprises handwritten characters, which recite "Mercedes B". The image also comprises background shading, an outline box, a dashed line under the handwritten characters, and machine written characters which recite "Merk, type". The input image is processed in S202, to give a binary image. The output of S202 is shown as the second image in FIG. 3(b). The binary image is then processed in S203 to isolate the handwritten characters. The output of step S203 is shown in FIG. 3(b), the third image.

In S203, the binary image is taken as input to a first model 40. The first model 41 processes the binary image to isolate the handwritten characters. The first model 41 will be described in more detail below. The output of the first model 40 is a binary image comprising the handwritten characters.

Figure 2B:
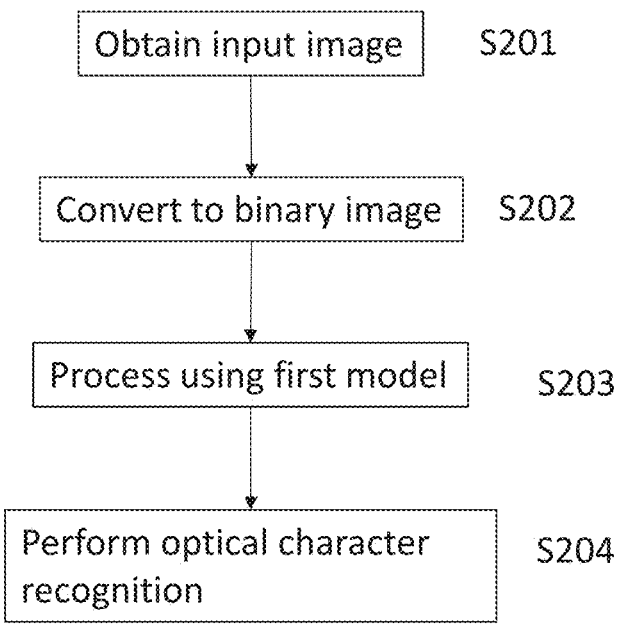
FIG. 2(b) is a schematic illustration of a method of processing an image in accordance with an embodiment.

The output of the method of FIG. 2(a) is a processed binary image. The processed binary image may then be taken as input to an optical character recognition process. FIG. 2(b) shows a schematic illustration of a method of processing an image in accordance with an alternative embodiment. In the method shown in FIG. 2(b), steps S201 to S203 are performed as described in relation to FIG. 2(a). The processed binary image is then taken as input to an optical character recognition process performed in S204.

In S204, optical character recognition is performed. The optical character recognition process outputs machine encoded text, in other words character code data, corresponding to the handwritten characters. Thus in the example shown in FIG. 3(b) for example, character code encoding "Mercedes B" is outputted. Various optical character recognition algorithms are known and are suitable for use in S204. For example, various optical character recognition algorithms are described in "A survey of deep learning approaches for OCR and document understanding", Subramani et al, 34th NeurIPS 2020 Workshop: ML Retrospectives, Surveys & Meta-analyses (ML-RSA). Vancouver, Canada, the entire contents of which is incorporated by reference herein.

Furthermore, although the term "optical character recognition" is used here, it is to be understood that this term is used in the general sense, to refer to a conversion of an image of text into machine encoded text. In the process described in S204, the binary image comprising the handwritten text is processed to output machine encoded text. This kind of optical character recognition includes intelligent character recognition (ICR), in which handwritten printscript or cursive text is processed one character at a time, and also includes intelligent word recognition (IWR), in which handwritten printscript or cursive text is processed one word at a time.

Figure 4:
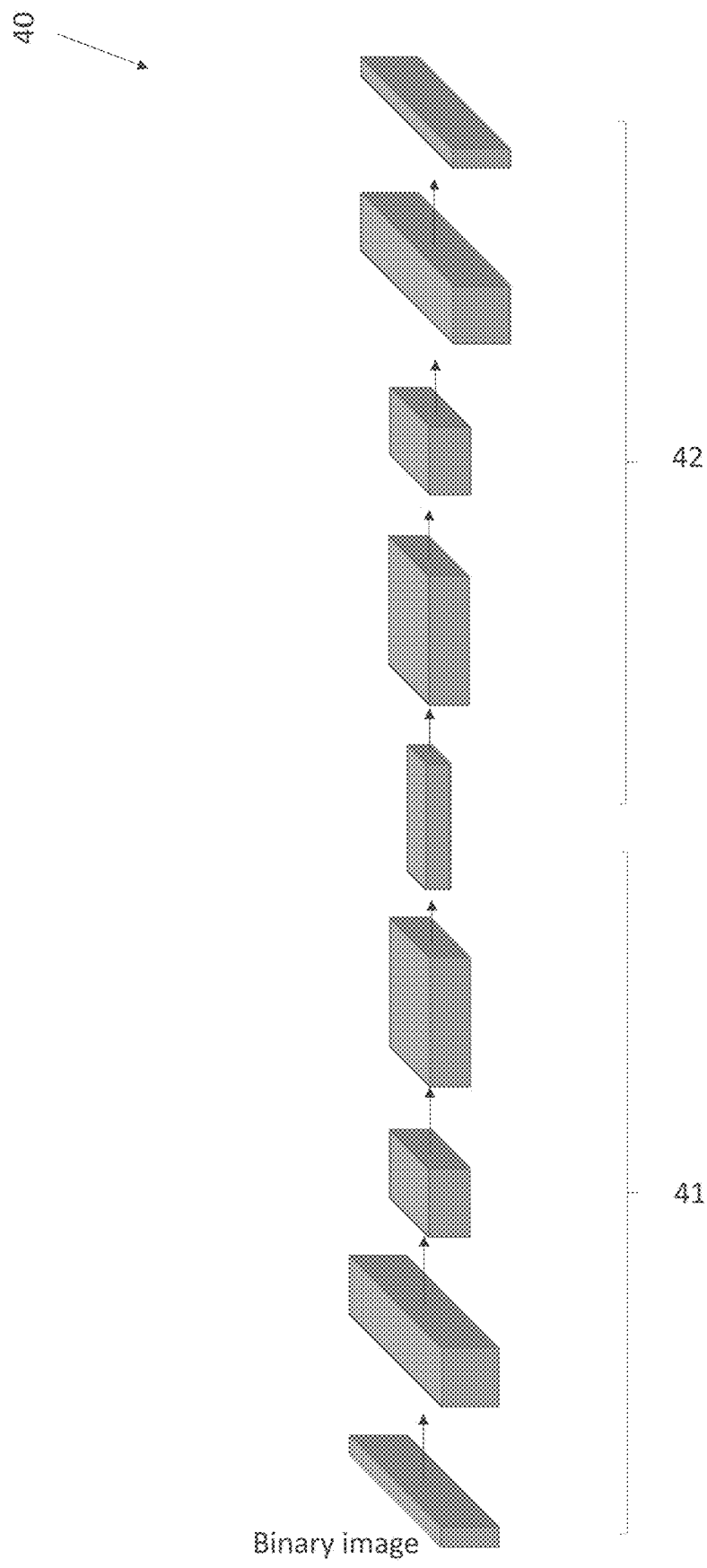
FIG. 4 is a schematic illustration of a first model which is used in a method in accordance with an embodiment.
Figure 5:
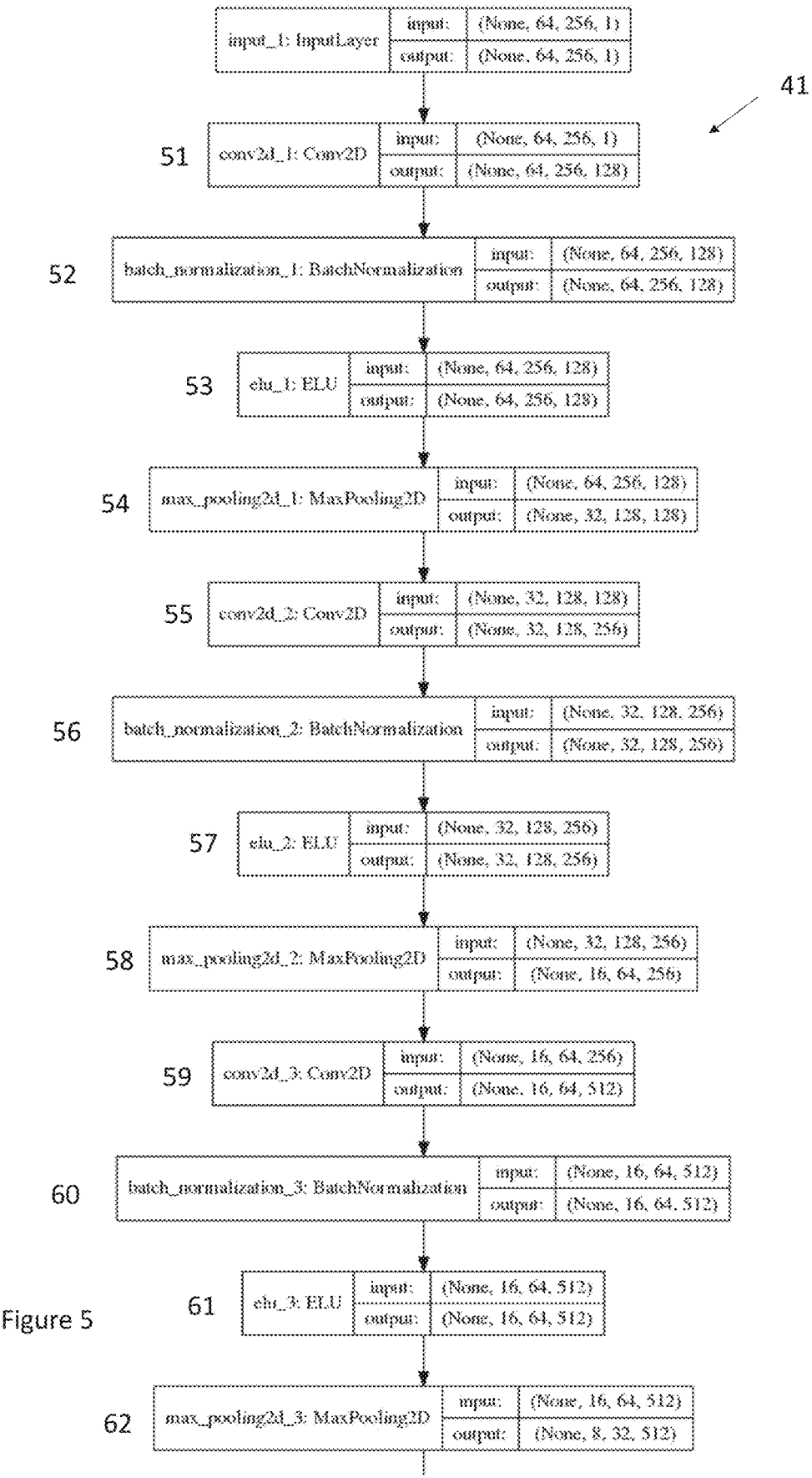
FIG. 5 is a schematic illustration of a first part of a first model which is used in a method in accordance with an embodiment.
Figure 6A:
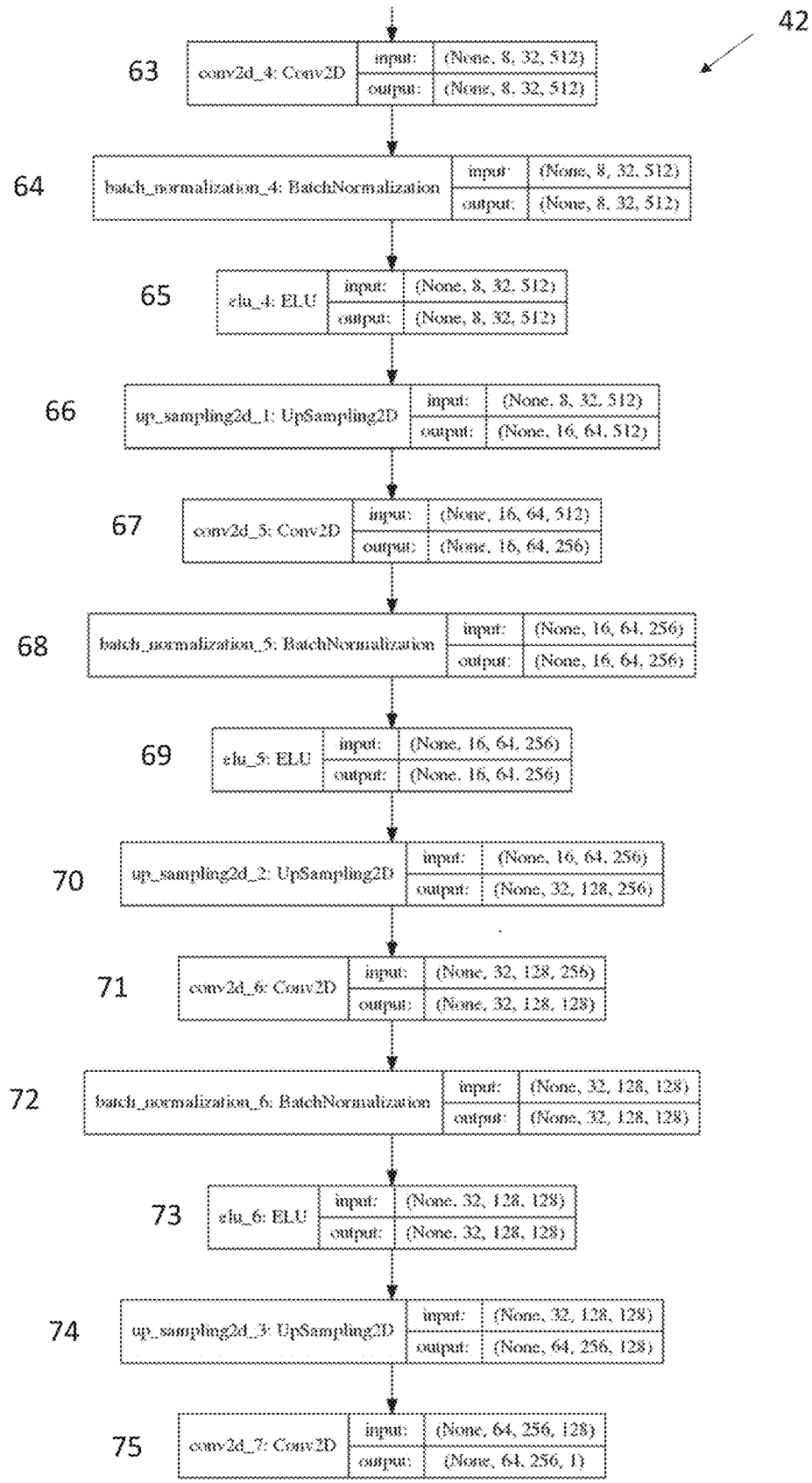
FIG. 6(a) is a schematic illustration of a second part of the first model which is used in a method in accordance with an embodiment.

A first model 40 according to a first embodiment will now be described in relation to FIGS. 4, 5 and 6(a). The first model 40 according to the first embodiment may be used in S203 in the methods described above. FIG. 4 serves to illustrate how the spatial dimensions of the data vary throughout the layers. FIGS. 5 and 6(a) detail the specific layers.

The first model 40 comprises a convolutional neural network (CNN). A CNN is a neural network comprising at least one convolutional layer. The first model 40 comprises a plurality of convolutional layers, with various numbers of filters, generating output volumes of various sizes. The filter weights are trainable parameters of the first model 40, which are determined during the training stage, described below in relation to FIG. 16(a). The first model 40 is a trained model.

As has been described previously, the input to the first model 40 is binary image data. Thus the input to the model has dimension corresponding to the number of pixels in the processed binary image, and depth 1. In this example, the processed binary image has 64×256 pixels, and therefore the input dimension is 64×256×1. Each pixel has a value of 0 or 1.

The first layer in the model is a first convolutional layer 51, as shown in FIG. 5. The first convolutional layer comprises a number of filters. Each filter in a convolutional layer has a depth matching the depth of the input data. In this case, the filter depth in the first convolutional layer 51 is therefore 1.

The depth of the output of a convolutional layer corresponds to the number of filters in the layer. In this example, there are 128 filters in the first convolutional layer 51, and therefore the output of the first convolutional layer 51 has a depth of 128.

The height and width of the output of a convolutional layer is determined by the height and width of the input to the layer, the receptive field size of the filters (both height and width), the padding and the filter stride. When the stride is 1, the filters slide one pixel at a time. When the stride is 2 then the filters slide 2 pixels at a time, producing a smaller output height and width. Any zero padding used at the borders increases the output size. In this case, the height and width of the output of the first convolutional layer 51 is the same as the height and width of the input to the first convolutional layer 51.

Each filter is moved along the width and height of the input data. At each position, the values in the filter are element-wise multiplied with the input data values, and the results are summed, resulting in a single value for each filter position. The output values for one filter form a 2D array, also referred to as a feature map. The output arrays from all the filters in the layer are stacked along the depth dimension, and the resulting volume of data input into the next layer.

A first pooling layer 54 is located after the first convolutional layer 51. The first pooling layer 54 decreases the width and height, whilst maintaining the same depth. The first pooling layer 54 is a max pooling layer in this example. A max pooling layer comprises a filter having a spatial extent and stride, which is moved across the input, taking the maximum value at each position. Functions other than the max pooling can be used however, for example, average pooling.

The output of the first pooling layer 54 has dimension 32×128×128, in other words the first pooling layer 54 acts to reduce the height and width whilst maintaining the depth.

A second convolutional layer 55 comprises a number of filters having a depth of 128. In this example, there are 256 filters in the second convolutional layer 55, and therefore the output of the second convolutional layer 55 has a depth of 256. The height and width of the output of the second convolutional layer 55 is the same as the height and width of the input of the second convolutional layer 55. The depth is increased.

The first model 40 comprises a first section 41, also referred to as an encoder section, comprising a plurality of convolutional layers. For each of the convolutional layers in the encoder section 41, the output has a larger depth than the depth of the input. For each of the convolutional layers in the encoder section 41, the output has a height and width which are equal to the height and width of the input. Each subsequent convolutional layer in the encoder section 41 has an increased number of filters. In this manner, the depth increases through each convolutional layer in the encoder section 41. In other words, the number of feature maps increases through the encoder section 41. The height and width output from the convolutional layers in the first section 41 remain the same in this example. However, a number of pooling layers are included which reduce the height and width, whilst maintaining depth.

Although only convolutional layers and pooling layers are discussed above, additional layers may be included in the first section 41, as shown in FIG. 5. FIG. 5 shows example layers of a first section 41 of a first model 40 used in a method according to the first embodiment.

As shown in FIG. 5, the first section 41 of the model comprises a batch normalisation layer implemented after each convolutional layer. The batch normalisation layers output data having the same dimension as the input data to the batch normalisation layer.

As shown in FIG. 5, the first section 41 of the model further comprises an activation layer implemented after each convolutional layer. The activation layer is located after the batch normalisation layer. For example, the model uses ELU (exponential linear unit) layers, which apply an elementwise activation function.

As shown in FIG. 5, the first convolutional layer 51 is followed by a first batch normalisation layer 52 and a first activation layer 53. The first convolutional layer 51 takes an input of 64×256×1 and outputs data of size 64×256×128. The first convolutional layer 51 comprises 128 filters. The first pooling layer 54 takes an input size 64×256×128 and performs max pooling to output data of size 32×128×128.

The second convolutional layer 55 is followed by a second batch normalisation layer 56 and a second activation layer 57. The second convolutional layer 56 takes an input of 32×128×128 and outputs data of size 32×128×256. The second convolutional layer 56 comprises 256 filters. The first section 41 further comprises a second pooling layer 58 which takes an input size 32×128×256 and performs max pooling to output data of size 16×64×256.

As shown in FIG. 5, the first section 41 further comprises a third convolutional layer 59, which is followed by a third batch normalisation layer 60 and a third activation layer 61. The third convolutional layer 60 takes an input of 16×64×256 and outputs data of size 16×64×512. The third convolutional layer 59 comprises 512 filters. The first section 41 further comprises a third pooling layer 62 which takes an input size 16×64×512 and performs max pooling to output data of size 8×32×512.

The first section 41 comprises a plurality of convolutional layers which increase the depth but maintain the width and height, and a number of pooling layers which maintain the depth but decrease the width and height. Overall, the first section results in data having an increased depth and decreased width and height compared to the input data. The encoder section 41 takes input data having dimension 64×256×1 and outputs data having dimension 8×32×512. The output data of the first section 41 has greater overall volume than the input data. However, although the depth is increased, the width and height are decreased.

Returning to FIG. 4, after the first section is located a second section 42. FIG. 6(a) shows example layers of a second section 42 of the first model 40 used in a method according to the first embodiment.

The second section 42 is a decoder section 42. The second section 42 comprises a fourth convolutional layer 63, which is followed by a fourth batch normalisation layer 64 and a fourth activation layer 65. The fourth convolutional layer 63 takes as input the data output from the third pooling layer 62. The fourth convolutional layer 63 takes an input of 8×32×512 and outputs data of size 8×32×512. The fourth convolutional layer 63 comprises 512 filters. The second section 42 further comprises a first up-sampling layer 66, which resizes the image using interpolation. The up-sampling layer increases the height and width of the input data, whilst maintaining the same depth. The first up-sampling layer 66 takes an input of 8×32×512 and outputs data of size 16×64×512.

The second section 42 further comprises a fifth convolution layer 67, which is followed by a fifth batch normalisation layer 68 and a fifth activation layer 69. The fifth convolutional layer 67 takes an input of 16×64×512 and outputs data of size 16×64×256. The fifth convolutional layer 63 comprises 256 filters. The second section 42 further comprises a second up-sampling layer 70. The second up-sampling layer 70 increases the height and width of the input data, whilst maintaining the same depth. The second up-sampling layer 70 takes an input of 16×64×256 and outputs data of size 32×128×512.

The second section 42 further comprises a sixth convolution layer 71, which is followed by a sixth batch normalisation layer 72 and a sixth activation layer 73. The sixth convolutional layer 71 takes an input of 32×128×256 and outputs data of size 32×128×128. The sixth convolutional layer 71 comprises 128 filters. The second section 42 further comprises a third up-sampling layer 74. The third up-sampling layer 74 increases the height and width of the input data, whilst maintaining the same depth. The third up-sampling layer 74 takes an input of 32×128×128 and outputs data of size 64×256×128.

The second section 42 further comprises a seventh convolution layer 75. The seventh convolutional layer 75 takes an input of 64×256×128 and outputs data of size 64×256×1. The seventh convolutional layer 75 comprises 1 filter.

The output of the first model 41 is the same size as the input binary image. In other words, there is a single output value corresponding to each pixel in the input binary image. The first model 40 comprises an encoder section 41, in which the layers decrease the height and width, whilst increasing the depth, and a decoder section 42, in which the layers increase the height and width, whilst decreasing the depth. This is illustrated schematically in FIG. 4.

An activation function is applied at the output, in a pixel-wise fashion, for example a sigmoid function. The activation function takes as input the value output for the pixel from the seventh convolutional layer 75, and outputs a value between 1 and 0. A threshold is then applied to the output, to set each pixel to 0 or 1. For example, if the value is less than 0.5, the pixel is set to 0, if the value is greater than or equal to 0.5, the pixel is set to 1. In this example, 1 is used for the background class, and 0 for the handwritten pixels.

The first model 40 outputs a processed binary image, comprising the same number of pixels as the input binary image. Each pixel is classified as either a "foreground" pixel, in other words a pixel that corresponds to a handwritten character, or a "background" pixel, in other words a pixel that does not correspond to a handwritten character. The "background" pixels are those having an output value of 1 and the foreground pixels are those having an output value of 0 in this example. The "background" pixels are those which are determined not to correspond to a handwritten character. The "background" pixels may correspond to other features of the image, for example machine written text, lines, background, etc. The first model 40 processes the binary image to indicate pixels which correspond to handwritten characters. These pixels are distinguished from the other pixels in the processed image.

Figure 7:
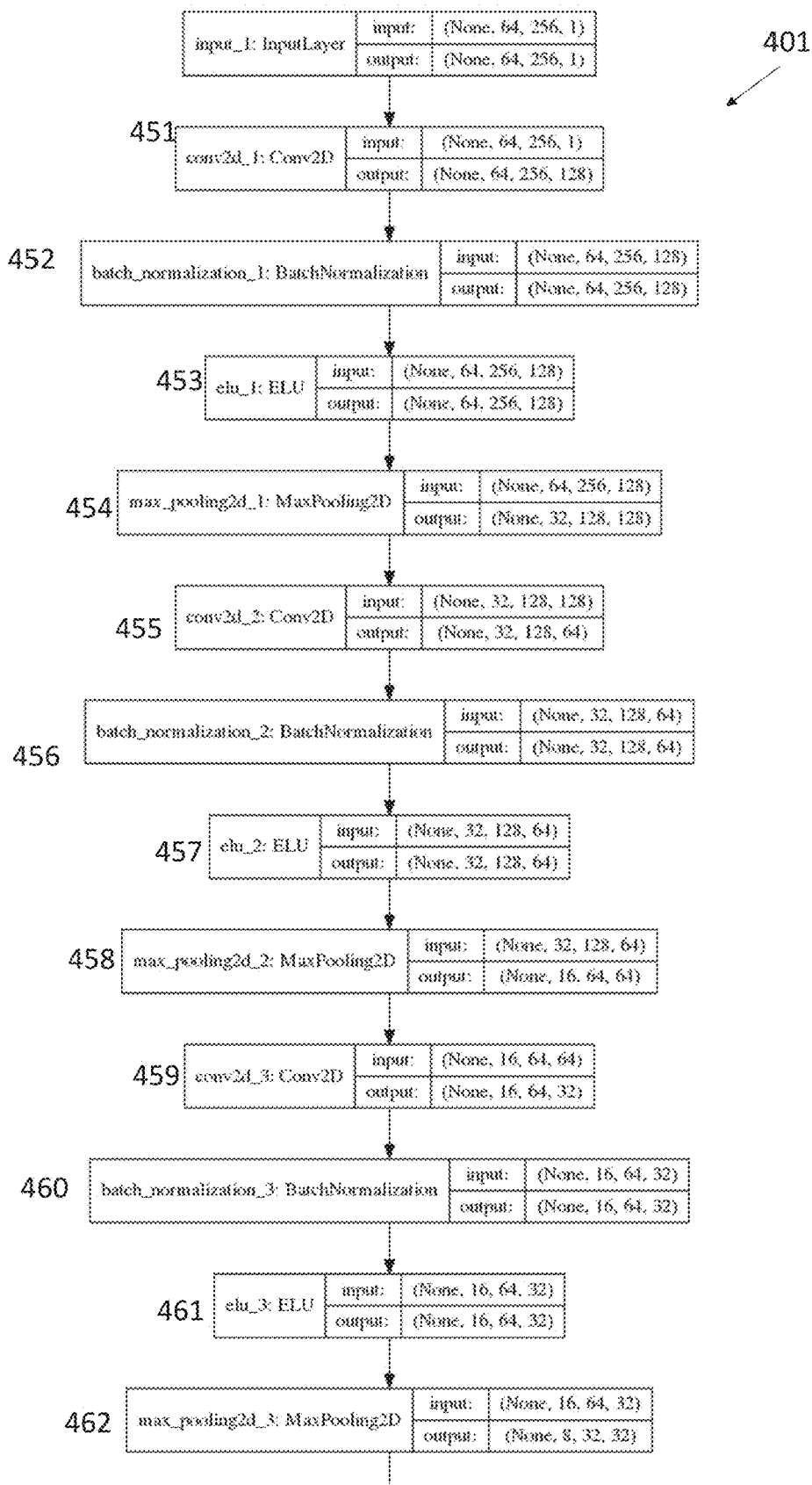
FIG. 7 is a schematic illustration of a first part of a model according to a comparative example.

A model according to a first comparative example will now be described in relation to FIGS. 7 and 8.

Figure 8A:
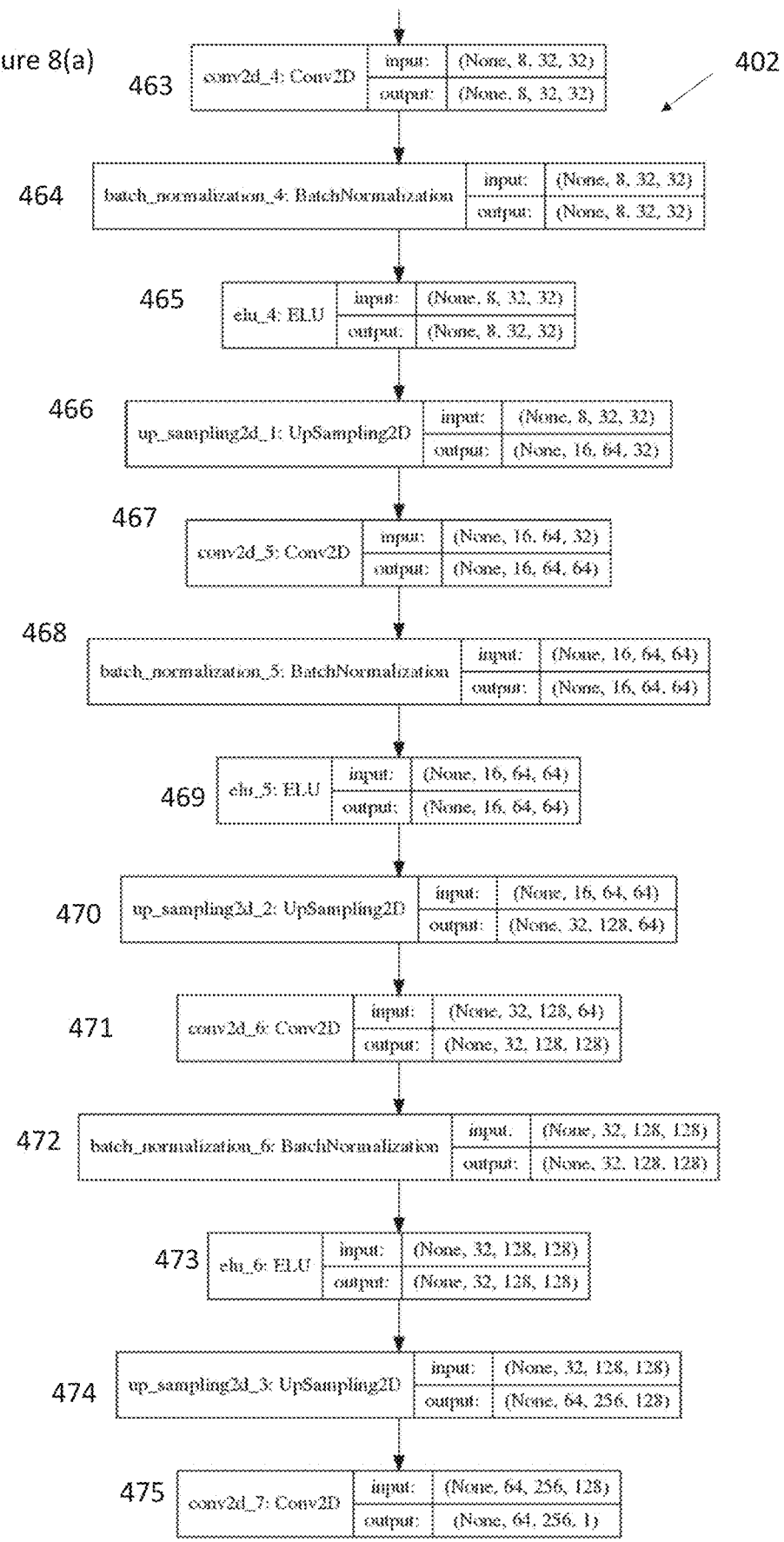
FIG. 8(a) is a schematic illustration of a second part of a model according to the comparative example.

The model comprises a first section 401 and a second section 402. FIG. 7 is a schematic illustration of the first section 401 of the model according to the first comparative example, and FIG. 8(a) is a schematic illustration of the second section 402 of the model according to the first comparative example.

As for the first model 40 shown in FIG. 5, the first section 401 comprises three blocks, each comprising a convolutional layer, a batch normalisation layer, an activation layer and a pooling layer. The first convolutional layer 451, first batch normalisation layer 452, first activation layer 453 and first pooling layer 454 are the same as the corresponding layers in the first section 41 of the first model 40.

However, whereas the second convolutional layer 55 of the first model 40 comprises 256 filters, increasing the depth of the input data from 128 to 256, the second convolutional layer 455 comprises 64 filters, decreasing the depth of the input data from 128 to 64, whilst maintaining the width and height. The second batch normalisation layer 456, second activation layer 457 and second pooling layer 458 act in the same way as the corresponding layers of the first model 40, but taking into account the smaller depth of the input data. The pooling layer acts to reduce the width and height by the same amount as the corresponding layer in the first model 40, whilst maintaining the depth.

Similarly, the third convolutional layer 459 comprises 32 filters, decreasing the depth of the input data from 64 to 32. The third pooling layer 462 also acts to reduce the width and height whilst maintaining depth as in the first model 40.

The first section 401 of the model according to a first comparative example outputs data having size 8×32×32. The first section 41 of the first model 40 outputs data having size 8×32×512. Thus the size of the data output from the encoder section in the comparative example is smaller than the input binary image data, and is smaller than the data output from the encoder section 41 of the first model 40.

As for the first model 40 shown in FIG. 6(a), the second section 402 of the model according to the first comparative example also comprises three blocks, each comprising a convolutional layer, a batch normalisation layer, an activation layer and a pooling layer, and then a final convolutional layer. The fourth convolutional layer 463 also outputs data having the same size as the input data. In this case, the input data is 8×32×32. The up sampling layers act to increase the width and height by the same amount as the corresponding layers in the first model 40, whilst maintaining the depth.

The fifth convolutional layer 467 in the first comparative example comprises 64 filters, increasing the depth of the input data from 32 to 64, whilst maintaining the width and height. Similarly, the sixth convolutional layer 471 comprises 128 filters, increasing the depth of the input data from 64 to 128. The final convolutional layer 475 of the first comparative example is the same as the final convolutional layer of the first model 40.

In the model of the first comparative example, the depth increases through the first convolutional layer 451, but then decreases through the remaining part of the encoder section 401. The depth increases through the decoder section 401, then decreases to 1 in the final convolutional layer. The height and width are modified in the same manner as by the first model 40.

FIG. 6(b) shows images outputted from the first model 40 according to the first embodiment, taking binarised versions of the images of FIG. 3(a) as input. The model outputs a binary image in which each pixel is classified as part of a handwritten character or not part of a handwritten character. Many of the features of the original images are therefore removed, for example the machine written text and the lines.

FIG. 8(b) shows images outputted from the model according to the first comparative example, taking binarised versions of the images of FIG. 3(a) as input.

The first model 40 according to the first embodiment and the model of the first comparative example were also tested as part of an optical character recognition method as described in FIG. 2(b), using 100 example input images, some of which are shown in FIG. 3(a). The same binarisation process was applied in S202 in both cases, and the same OCR process applied in S204. The outputs corresponding to the input images shown in FIG. 3(a) are shown below.

TABLE 1

Example results of first embodiment and first comparative example

| Text | First embodiment | Distance | First comparative example | Levenshtein Distance |
|---|---|---|---|---|
| alfa romeo | ala romeo | 0.1 | altk daikio | 0.7 |
| corpo 4 | corpo y | 0.14 | corpo y | 0.14 |
| bmw 318 | bmw 318 | 0 | hiv aur | 0.86 |
| audi a5 | auai 45 | 0.43 | qual is | 0.56 |
| volkswagen | volkswagen | 0.9 | volksung | 0.4 |
| skoda rapid | Nknda fapid | 0.36 | tatlo and | 0.73 |
| citroen berlingo | citnoen berlin | 0.06 | ginan berling | 0.44 |
| mercedes b | mercedes b | 0 | herodo b b | 0.6 |
| daf x f | lx ste | 0.86 | ix the | 0.86 |

The average Levenshtein distance was determined for the 100 inputs. Using the first model 40 according to the first embodiment, the average distance was 0.27, whereas using the model of the first comparative example, the average distance was 0.68.

Figure 9:
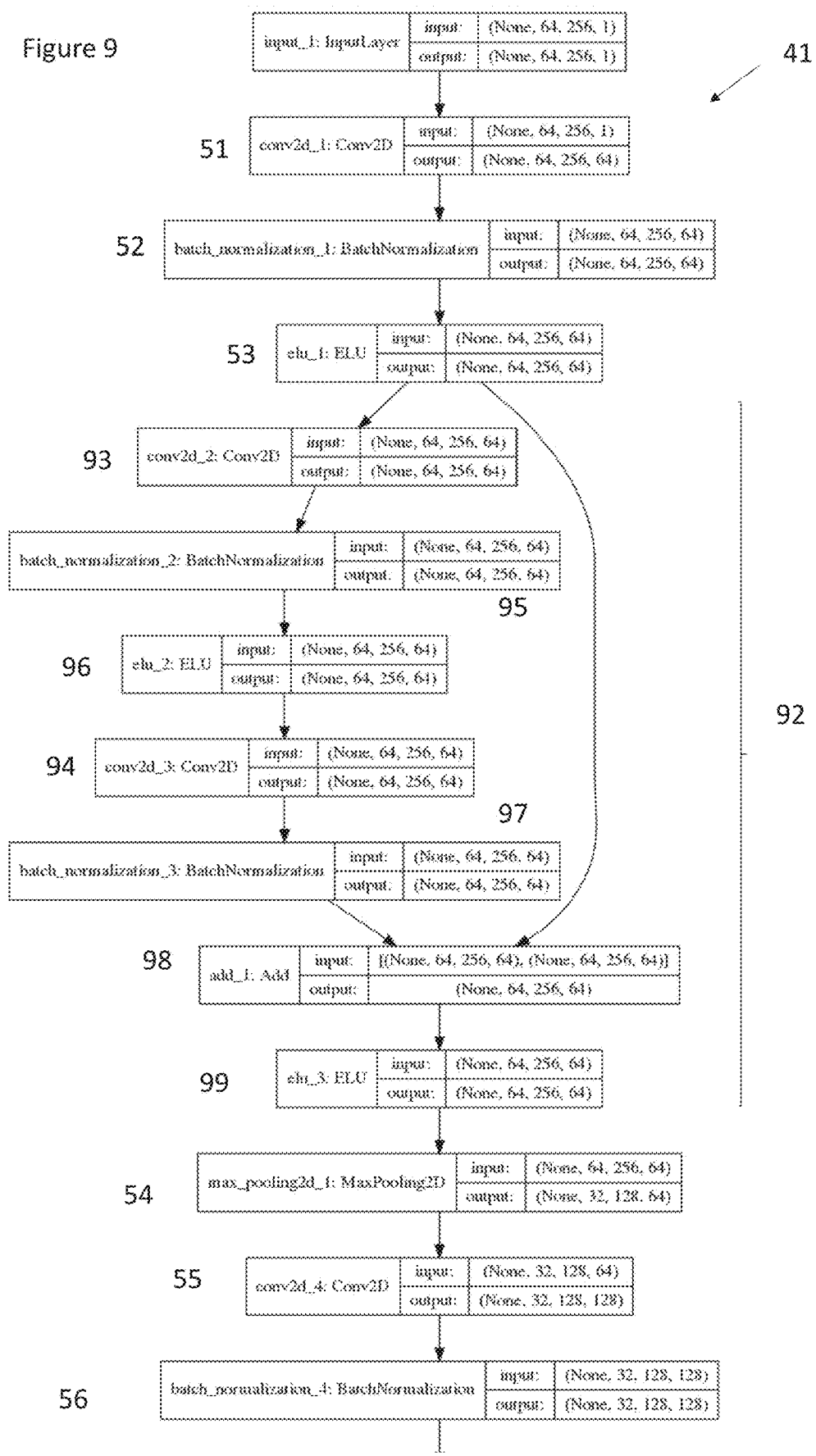
FIG. 9 is a schematic illustration of a first part of a first model which is used in a method in accordance with an embodiment.
Figure 10:
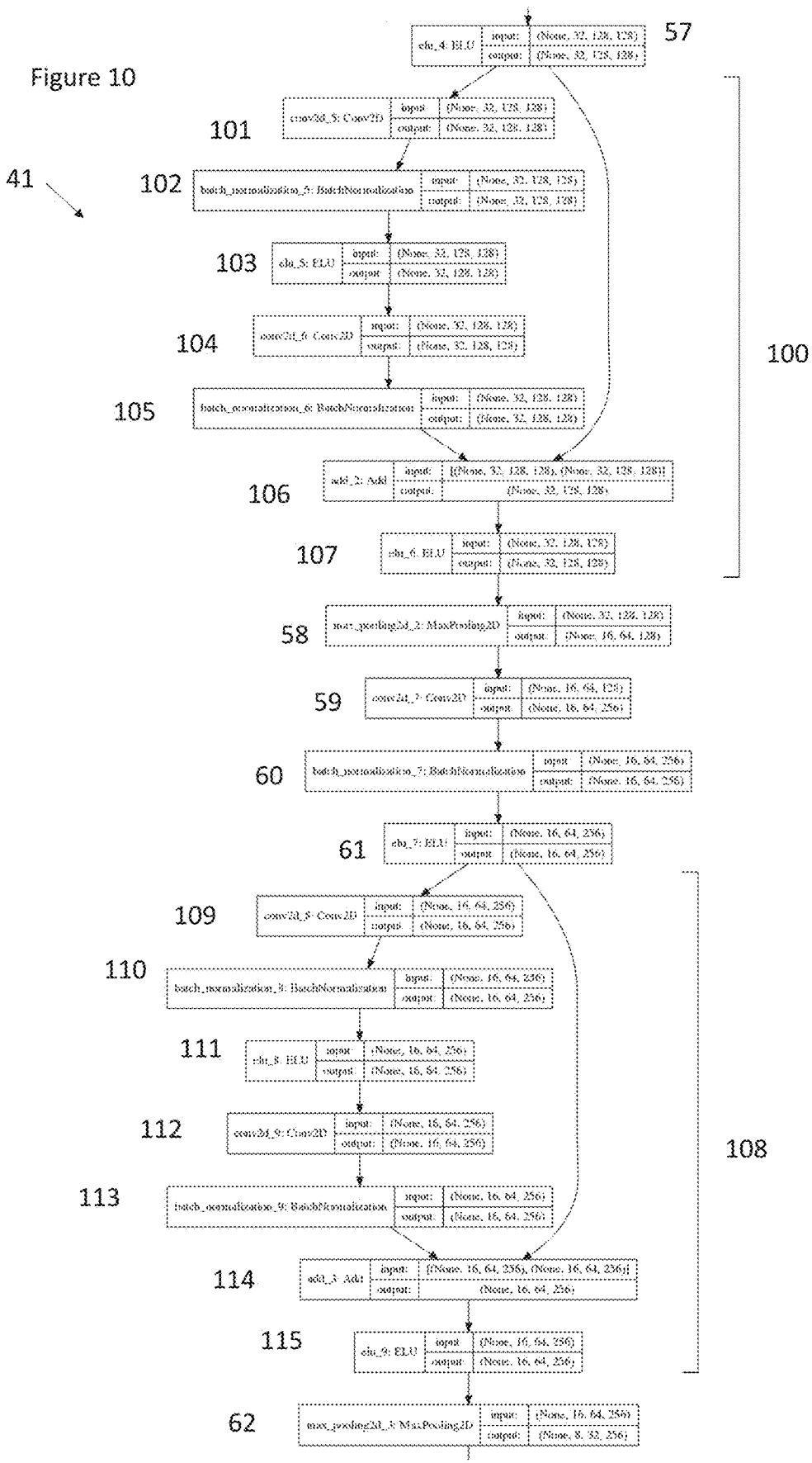
FIG. 10 is a schematic illustration of a first part of the first model which is used in a method in accordance with an embodiment.
Figure 11:
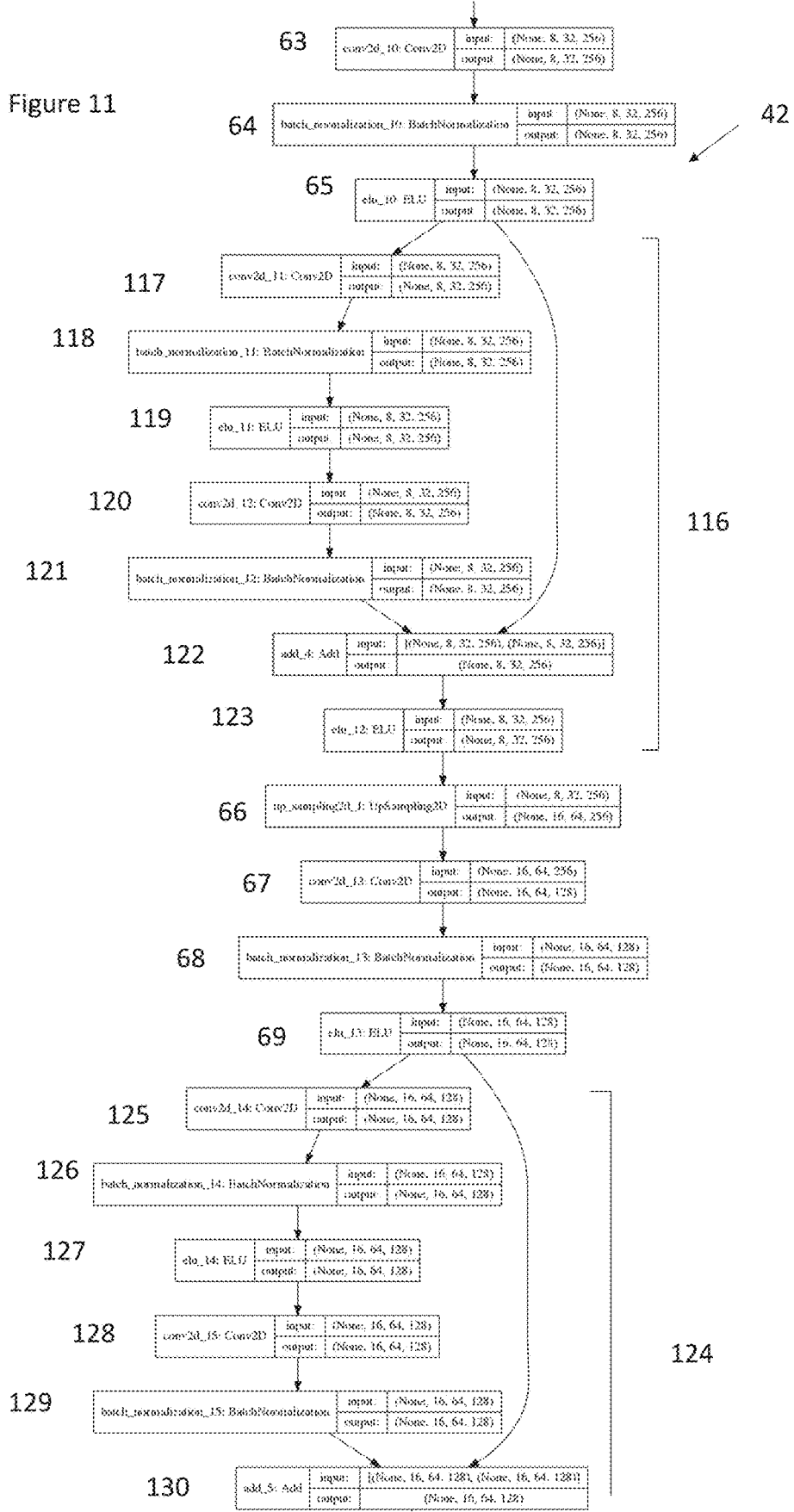
FIG. 11 is a schematic illustration of a third part of the first model which is used in a method in accordance with an embodiment.
Figure 12A:
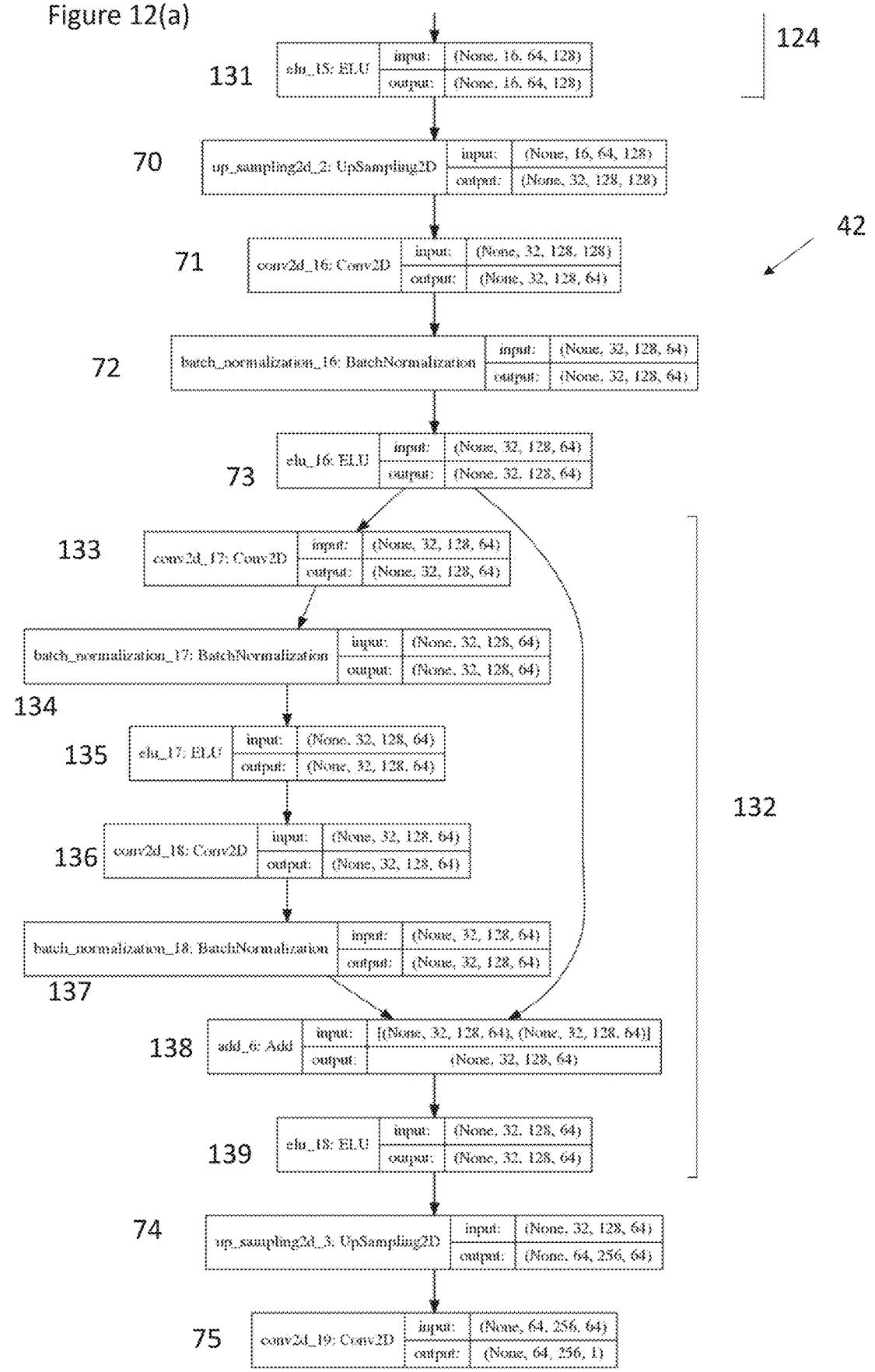
FIG. 12(a) is a schematic illustration of a fourth part of the first model which is used in a method in accordance with an embodiment.

FIGS. 9, 10, 11 and 12(a) show a schematic illustration of an alternative first model which is used in a method according to a second embodiment. The first model according to the second embodiment comprises a plurality of skip connections. In more detail, the encoder section 41, which is shown in FIGS. 9 and 10, comprises three skip connections which connect between layers within the encoder section 41. The decoder section 42, which is shown in FIGS. 11 and 12, also comprises three skip connections which connect between layers within the decoder section 42. None of the skip connections connect between a layer in the encoder section 41 and a layer in the decoder section 42. The encoder section 41 and the decoder section 42 each comprise one or more short skip connections. In this example, each skip connection skips over two convolutional layers. In alternative examples, each skip connection skips over three convolutional layers. The skip connection may skip over one or more than two convolutional layers however. Each skip connection skips over consecutive convolutional layers that do not change the input dimensions. The skip connections are implemented as residual connections, in other words using element-wise addition.

In the first model according to the second embodiment, a first convolutional layer 51 is followed by a first batch normalisation layer 52 and a first activation layer 53. These layers are similar to those in the first model according to the first embodiment, however the first convolutional layer 51 takes an input of 64×256×1 and outputs data of size 64×256×64, in other words the first convolutional layer 51 comprises 64 filters. The first convolutional layer 51 increases the size of the data.

After the first activation layer 53, a first residual block 92 is located. The first residual block 92 comprises a first further convolution layer 93 and a second further convolutional layer 94, each of which take an input of 64×256×64 and output data of size 64×256×64. These layers do not change the dimensions of the input data—they each have 64 filters having a filter depth of 64. Between the two further convolutional layers 93 and 94 there is included a first further batch normalisation layer 95 and a first further activation layer 96. After the second further convolutional layer 94 there is included a second further batch normalisation layer 97.

A first addition layer 98 is included. The first addition layer takes the output for the second further batch normalisation layer 97, which has size 64×256×64, and the output of the first activation layer 53, which also has size 64×256×64, and combines these outputs in an element-wise addition operation. A second further activation layer 99 is then included. This layer feeds into the first pooling layer 54. The first pooling layer 54 takes an input size 64×256×64 and performs max pooling to output data of size 32×128×64, which is taken as input to a second convolutional layer 55.

The second convolutional layer 55 is followed by a second batch normalisation layer 56 and a second activation layer 57. The second convolutional layer 55 takes an input of 32×128×64 and outputs data of size 32×128×128. The second convolutional layer 56 comprises 128 filters, and again increases the size of the data.

The second activation layer 57 feeds into a second residual block 100. The second residual block 100 comprises a third further convolution layer 101 and a fourth further convolutional layer 104, each of which take an input of 32×128×128 and output data of size 32×128×128. These layers do not change the dimensions—they each have 128 filters having a filter depth of 128. Between the two further convolutional layers 101 and 104 there is included a third further batch normalisation layer 102 and a third further activation layer 103. After the fourth further convolutional layer 104 there is included a fourth further batch normalisation layer 105.

A second addition layer 106 is included. The second addition layer 106 takes the output of the fourth further batch normalisation layer 105, which has size 32×128×128, and the output of the second activation layer 57, which also has size 32×128×128, and combines these outputs in an element-wise addition operation. A fourth further activation layer 107 is then included. This layer feeds into the second pooling layer 58.

The pooling layer 58 which takes an input size 32×128×128 and performs max pooling to output data of size 16×64×128. The first section 41 further comprises a third convolutional layer 59, which is followed by a third batch normalisation layer 60 and a third activation layer 61. The third convolutional layer 60 takes an input of 16×64×128 and outputs data of size 16×64×256. The third convolutional layer 59 comprises 256 filters and again increases the size of the data.

The third activation layer 61 feeds into a third residual block 108. The third residual block 108 comprises a fifth further convolution layer 109 and a sixth further convolutional layer 112, each of which take an input of 16×64×256 and output data of size 16×64×256. These layers do not change the dimensions—they each have 256 filters having a filter depth of 256. Between the two further convolutional layers 109 and 112 there is included a fifth further batch normalisation layer 110 and a fifth further activation layer 111. After the sixth further convolutional layer 112 there is included a sixth further batch normalisation layer 113.

A third addition layer 114 is included. The third addition layer 114 takes the output of the sixth further batch normalisation layer 113, which has size 16×64×256, and the output of the third activation layer 61, which also has size 16×64×256, and combines these outputs in an element-wise addition operation. A sixth further activation layer 115 is then included. This layer feeds into the third pooling layer 62.

The third pooling layer 62 takes an input size 16×64×256 and performs max pooling to output data of size 8×32×256.

The first section 41 comprises a plurality of convolutional layers which increase the depth but maintain the width and height, and a number of pooling layers which maintain the depth but decrease the width and height. It further comprises a number of residual blocks which maintain the dimensions. Overall, the first section results in data having an increased depth and decreased width and height compared to the input data. The encoder section 41 takes input data having dimension 64×256×1 and outputs data having dimension 8×32×256. The output data of the first section 41 has greater overall volume than the input data. However, although the depth is greater increased, the width and height are decreased.

After the first section 41 is located a second section 42. FIGS. 11 and 12 show example layers of a second section 42 of a first model 40 used in a method according to the second embodiment.

The second section 42 is a decoder section 42. The second section 42 comprises a fourth convolution layer 63, which is followed by a fourth batch normalisation layer 64 and a fourth activation layer 65. The fourth convolutional layer 63 takes an input of 8×32×256 and outputs data of size 8×32×256. The fourth convolutional layer 63 comprises 256 filters.

The fourth activation layer 65 feeds into a fourth residual block 116. The fourth residual block 116 comprises a seventh further convolution layer 117 and an eighth further convolutional layer 120, each of which take an input of 8×32×256 and output data of size 8×32×256. These layers do not change the dimensions—they each have 256 filters having a filter depth of 256. Between the two further convolutional layers 117 and 120 there is included a seventh further batch normalisation layer 118 and a seventh further activation layer 119. After the eighth further convolutional layer 120 there is included an eighth further batch normalisation layer 121.

A fourth addition layer 122 is included. The fourth addition layer 122 takes the output of the eighth further batch normalisation layer 121, which has size 8×32×256, and the output of the fourth activation layer 65, which also has size 8×32×256, and combines these outputs in an element-wise addition operation. An eighth further activation layer 123 is then included. This layer feeds into a first up-sampling layer 66.

The first up-sampling layer 66 resizes the image using interpolation. The up-sampling layer 66 increases the height and width of the input data, whilst maintaining the same depth. The first up-sampling layer 66 takes an input of 8×32×256 and outputs data of size 16×64×256.

The second section 42 further comprises a fifth convolution layer 67, which is followed by a fifth batch normalisation layer 68 and a fifth activation layer 69. The fifth convolutional layer 67 takes an input of 16×64×256 and outputs data of size 16×64×128. The fifth convolutional layer 63 comprises 128 filters and reduces the size of the data.

The fifth activation layer 69 feeds into a fifth residual block 124. The fifth residual block 124 comprises a ninth further convolution layer 125 and a tenth further convolutional layer 128, each of which take an input of 16×64×128 and output data of size 16×64×128. These layers do not change the dimensions they each have 128 filters having a filter depth of 128. Between the two further convolutional layers 125 and 128 there is included a ninth further batch normalisation layer 126 and a ninth further activation layer 127. After the tenth further convolutional layer 128 there is included a tenth further batch normalisation layer 129.

A fifth addition layer 130 is included. The fifth addition layer 130 takes the output of the tenth further batch normalisation layer 129, which has size 16×64×128, and the output of the fifth activation layer 69, which also has size 16×64×128, and combines these outputs in an element-wise addition operation. A tenth further activation layer 131 is then included. This layer feeds into a second up-sampling layer 70.

The second up-sampling layer 70 increases the height and width of the input data, whilst maintaining the same depth. The second up-sampling layer 70 takes an input of 16×64×128 and outputs data of size 32×128×128.

The second section 42 further comprises a sixth convolution layer 71, which is followed by a sixth batch normalisation layer 72 and a sixth activation layer 73. The sixth convolutional layer 71 takes an input of 32×128×128 and outputs data of size 32×128×64. The sixth convolutional layer 71 comprises 64 filters and reduces the size of the data.

The sixth activation layer 73 feeds into a sixth residual block 132. The sixth residual block 132 comprises an eleventh further convolution layer 133 and a twelfth further convolutional layer 136, each of which take an input of 23×128×64 and output data of size 23×128×64. These layers do not change the dimensions—they each have 64 filters having a filter depth of 64. Between the two further convolutional layers there is included an eleventh further batch normalisation layer 134 and an eleventh further activation layer 135. After the twelfth further convolutional layer 136 there is included a twelfth further batch normalisation layer 137.

A sixth addition layer 138 is included. The sixth addition layer 138 takes the output of the twelfth further batch normalisation layer 137, which has size 23×128×64, and the output of the sixth activation layer 73, which also has size 23×128×64, and combines these outputs in an element-wise addition operation. A twelfth further activation layer 139 is then included.

The second section 42 comprises output layers which are similar to those of the first model 41 according to the first embodiment, including a third up-sampling layer 74. The third up-sampling layer 74 increases the height and width of the input data, whilst maintaining the same depth. The third up-sampling layer 74 takes an input of 32×128×64 and outputs data of size 64×256×64. The second section 42 further comprises a seventh convolution layer 75. The seventh convolutional layer 75 takes an input of 64×256×64 and outputs data of size 64×256×1. The seventh convolutional layer 75 comprises 1 filter.

The model according to the second embodiment comprises a number of residual blocks within the encoder section 41 and a number of residual blocks inside the decoder section 42. The residual blocks comprise a skip connection. The skip connection skips one or more layers and feeds the output of one layer as the input to the layer after the skipped layers. By using one or more skip connections in the encoder side 41 and one or more skip connections in the decoder side 42, information from the downstream is fed directly to the upstream. Inputting features from an earlier layer directly into a later layer, skipping one or more intervening layers, provides additional information to the later layers.

Figure 13:
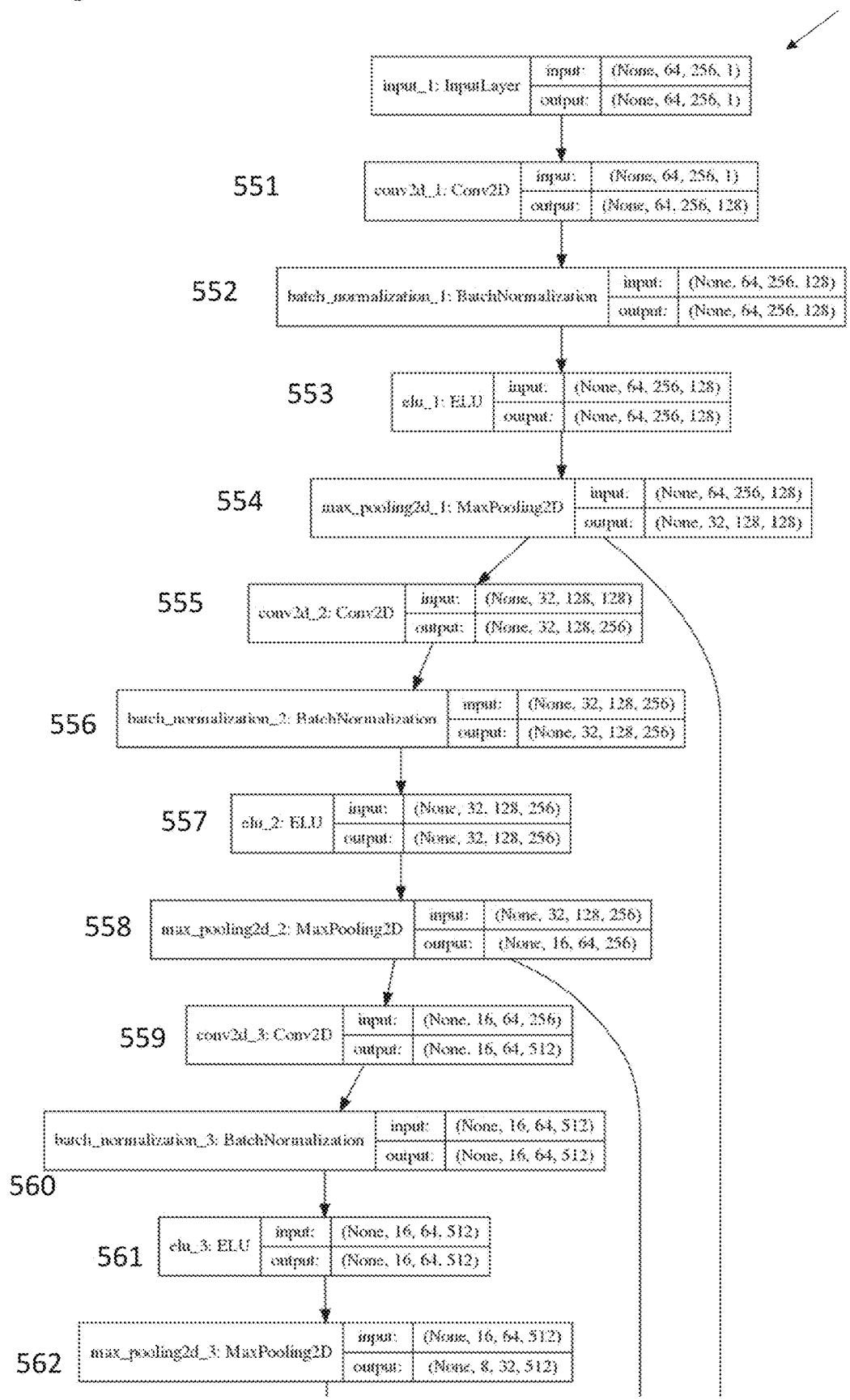
FIG. 13 is a schematic illustration of a first part of a model according to a comparative example.
Figure 14A:
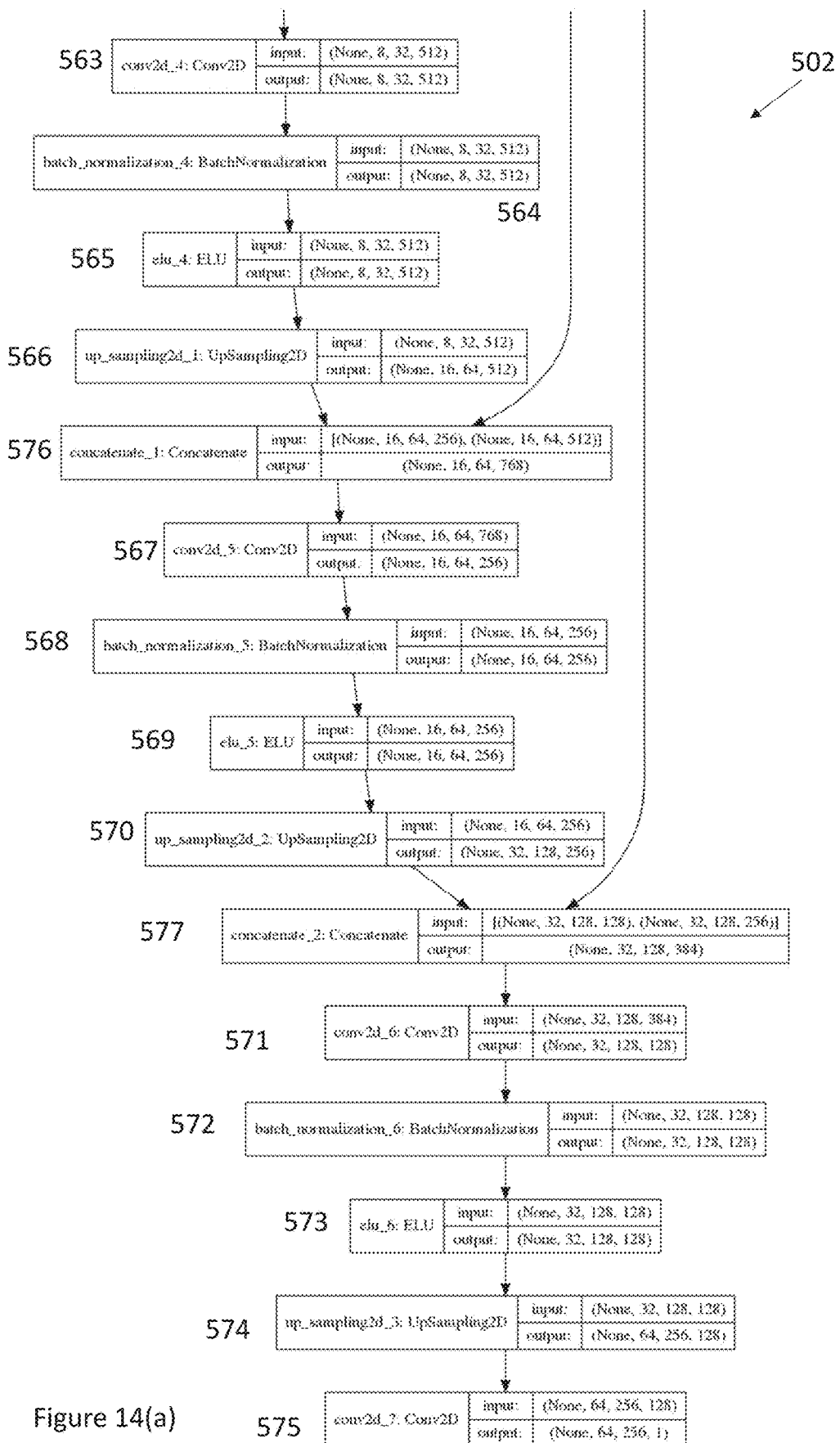
FIG. 14(a) is a schematic illustration of a second part of a model according to the comparative example.

A model according to a second comparative example will now be described in relation to FIGS. 13 and 14. The model comprises a first section 501 and a second section 502. FIG. 13 is a schematic illustration of the first section 501 of the model according to the second comparative example, and FIG. 14(*a*) is a schematic illustration of the second section 502 of the model according to the second comparative example. The model according to the second comparative example comprises a number of skip connections from a layer within the encoder section 41 to a layer within the decoder section 42. The skip connections cross from the encoder 41 to the decoder 42.

As for the model shown in FIG. 5, the first section 501 comprises three blocks, each comprising a convolutional layer, a batch normalisation layer, an activation layer and a pooling layer. The first convolutional layer 551, first batch normalisation layer 552, first activation layer 553 and first pooling layer 554 are the same as the corresponding layers in the first section 41 shown in FIG. 5. The second convolutional layer 555, second batch normalisation layer 556, second activation layer 557 and second pooling layer 558 are the same as the corresponding layers in the first section 41 shown in FIG. 5. The third convolutional layer 559, third batch normalisation layer 560, third activation layer 561 and third pooling layer 562 are the same as the corresponding layers in the first section 41 shown in FIG. 5.

As for the model shown in FIG. 6(*a*), the second section 502 comprises three blocks, each comprising a convolutional layer, a batch normalisation layer, an activation layer and an up-sampling layer. The fourth convolutional layer 563, fourth batch normalisation layer 564, fourth activation layer 565 and first up-sampling layer 566 are the same as the corresponding layers in the second section 42 shown in FIG. 6(*a*).

However, after the first up-sampling layer 566, a first concatenation layer 576 is provided. The first concatenation layer 576 concatenates the output of the first up-sampling layer, which has dimensions 16×64×512 with the output of the second pooling layer 558, which has dimension 16×64× 256. The output of the first concatenation layer 576 has dimension 16×64×768.

The output of the first concatenation layer 576 is taken as input to the fifth convolutional layer 567, which comprises 256 filters having depth 768, and outputs data having size 16×64×256. The fifth batch normalisation layer 568, fifth activation layer 569 and second up-sampling layer 570 are the same as the corresponding layers in the second section 42 shown in FIG. 6(a).

After the second up-sampling layer 570, a second concatenation layer 577 is provided. The second concatenation layer 577 concatenates the output of the second up-sampling layer 570, which has dimensions 32×128×256 with the output of the first pooling layer 554, which has dimension 32×128×128. The output of the second concatenation layer 577 has dimension 32×128×384.

The output of the second concatenation layer 577 is taken as input to the sixth convolutional layer 571, which comprises 128 filters having depth 384, and outputs data having size 32×128×128. The sixth batch normalisation layer 572, sixth activation layer 573, third up-sampling layer 574 and seventh convolutional layer 75 are the same as the corresponding layers in the second section 42 shown in FIG. 6(a).

FIG. 12(b) shows images outputted from the first model 40 according to the second embodiment, taking binarised versions of the images of FIG. 3(a) as input. The model outputs a binary image in which each pixel is classified as part of a handwritten character or not part of a handwritten character. Many of the features of the original images are therefore removed, for example the machine written text and the lines. FIG. 14(b) shows images outputted from the model according to the second comparative example, taking binarised versions of the images of FIG. 3(a) as input. Much of the machine written text remains in the image, since the model according to the second comparative example more frequently mis-identifies machine written characters as handwritten characters.

The first model according to the second embodiment and the model of the second comparative example were both tested using the same 100 input images described previously, again using the same binarisation process and OCR process. The results corresponding to the input images shown in FIG. 3(a) are shown below.

TABLE 2

Example results of second embodiment and second comparative example

| Text | Second embodiment | Distance | Second comparative example | Levenshtein Distance |
|---|---|---|---|---|
| alfa romeo | ala romeo | 0.1 | ala romeo | 0.1 |
| corpo 4 | corpo y | 0.14 | corpo y | 0.14 |
| bmw 318 | bmw 318 | 0 | bmw 318 | 0 |
| audi a5 | auai 45 | 0.14 | aulai 45 | 0.29 |
| volkswagen | volkswagen | 0 | andere volkswagen | 0.9 |
| skoda rapid | nknda fapid | 27 | mkoda laad | 0.36 |
| citroen berlingo | citnoen berlin | 0.25 | citroen berlife | 0.19 |
| mercedes b | mercedes b | 0 | typ mercedes b | 0.4 |
| daf x f | ix ste | 0.86 | ix suc odki wow | 1 |

The average Levenshtein distance was also determined for the 100 inputs. Using the model of the second embodiment, the average distance was 0.19, whereas using the model of the second comparative example, the average distance was 0.47.

Although FIGS. 5 and 6 show a first model 40 which may be used in a method according to a first embodiment, and FIGS. 9, 10, 11 and 12(a) show a first model 40 which may be used in a method according to a second embodiment, it will be understood that various architectures may be used for the first model 40. For example, the first model 40 may comprise no skip connections or the first model 40 may comprise one or more skip connections.

As described in relation to FIG. 2(b) above, an optical character recognition step is performed in S204. Various optical character recognition algorithms are known and are suitable for use in S204. An example of an optical character recognition system which could be used in S204 is described in "An End-to-End Trainable Neural Network for Image-based Sequence Recognition and Its Application to Scene Text Recognition", Shi et al, arXiv:1507.05717v1, 21 Jul. 2015, the entire contents of which are incorporated by reference herein.

An optical character recognition method may comprise applying an "end to end" model, which may comprise a trained neural network for example. Examples of optical character recognition systems which use such "end to end" models include MMOCR, PaddleOCR, Tesseract and CRNN ClovaAl. Alternatively, an optical character recognition method may comprise a separate image segmentation step and a classification step. An example in which the optical character recognition method comprises a separate image segmentation step and classification step is described below.

The image segmentation step may comprise line level segmentation, word level segmentation and character level segmentation. Alternatively, where the input images comprise only a single line of text, such as those shown in FIG. 3(a) for example, the line level segmentation step may be omitted. Similarly, if the input images comprise only a single word, the word level segmentation may be omitted. Similarly, if the input images are to be processed using IWR, in which handwritten text is processed one word at a time, the character level segmentation may be omitted. The image segmentation may comprise a single step of character level segmentation, without a separate line level and word level step. Various methods of segmentation are known and suitable for use in S204. A process of segmentation based on a histogram projection technique will be described as an example.

For line segmentation, in a histogram projection based technique, the number of "foreground" pixels (i.e. those having a value of 0 in this example) along each of the rows of the image are counted. Rows that comprise the handwritten text are those having a relatively higher number of "foreground" pixels and rows that correspond to the gaps between the lines have a relatively lower number of "foreground" pixels. Rows which correspond to lower numbers of "foreground" pixels are selected as the segmenting lines to separate the lines of handwritten text. The rows corresponding to a lower number of "foreground" pixels can be selected by applying a threshold. The threshold may be a pre-determined fixed number, or an adaptive thresholding based technique may be used to set a threshold for each image.

For word segmentation, in a histogram projection based technique, the number of "foreground" pixels (i.e. those having a value of 0 in this example) along each of the columns of the image are counted. Columns that comprise the handwritten text are those having a relatively higher number of "foreground" pixels and columns that correspond to the gaps between the words have a relatively lower number of "foreground" pixels. Columns which correspond to lower numbers of "foreground" pixels are selected as the segmenting lines to separate the words. The columns corresponding to a lower number of "foreground" pixels can be selected by applying a threshold. The threshold may be a pre-determined fixed number, or an adaptive thresholding based technique may be used to set a threshold for each image. For segmenting words, columns are selected as segmenting lines only if a group of columns having a lower number of "foreground" pixels that span greater than a threshold width are present, so as not to include smaller gaps between the characters.

Other methods of line segmentation and word segmentation may be used. For example, a trained neural network may be used to perform one or both of line segmentation of word segmentation. A trained neural network may be used to output word images or text line images, as described in "EAST: An Efficient and Accurate Scene Text Detector", Zhou et al, arXiv:1704.03155v2, 10 Jul. 2017 for example, the entire contents of which are incorporated herein by reference.

Character segmentation may be performed in a similar manner to word segmentation. For handwritten text, the columns between the characters may still comprise some "foreground" pixels, and therefore additional considerations such as an expected character width may be taken into account when performing the character segmentation. The character segmentation step outputs a one or more "character images" for each processed binary image output from the first model 40.

Other methods of character level segmentation may be used. For example, a trained neural network may be used to perform character level segmentation, as described in "EAST: An Efficient and Accurate Scene Text Detector", Zhou et al, arXiv:1704.03155v2, 10 Jul. 2017 for example, the entire contents of which are incorporated herein by reference.

Each character image is then classified in the classification step. The classification step uses a trained classification model, which outputs a probability corresponding to each of a set of possible characters for an input character image. For example, the classification model may comprise a convolutional neural network comprising a plurality of convolutional layers. The first layer in the classification model is a convolutional layer, comprising a number of filters having a depth of 1. The number of filters increases through the convolutional layers. The height and width of the output data decreases, by using pooling layers or increased filter stride for example. Each filter in the first layer is moved along the width and height of the input character image. At each position, the values in the filter are element-wise multiplied with the pixel values, and the results are summed, resulting in a single value for each filter position. The output values for one filter form a 2D array, also referred to as a feature map. The output arrays from all the filters in the layer are stacked along the depth dimension, and the resulting volume of data input into the next layer. Additional layers such as pooling layers and batch normalisation layers may be included with the convolutional layers.

The convolutional layers are followed by one or more fully connected layers. A softmax function is applied at the output. Each output node corresponds to a possible character. The possible characters may be the set of alphanumeric characters for example. The output node corresponding to the highest probability may be taken as the recognised character.

The filter weights of the convolutional layers are the trainable parameters of the classification model, which are determined during a training stage. The network is trained using a dataset of example character images together with the labelled character. The gradient of the loss with respect to each of the trainable parameters of the classification model is determined through back-propagation. A cross entropy loss function is used. The gradients are then used to determine the updated parameters, using an optimiser function. Once trained, the classification model can be used to classify an unseen character image, such as those taken from the processed binary image, as corresponding to a particular character.

An example of an optical character recognition process based on intelligent character recognition (ICR), in which handwritten text is processed one character at a time, is described here. However, various methods of optical character recognition can be used to determine the character code data corresponding to the handwritten characters in the processed binary image.

As described previously, the first model 40 used to pre-process the binary image prior to optical character recognition being performed is a trained model. In order to train the first model 40, a corpus of training data is obtained.

The training data may be obtained by taking real world examples of images of text, and editing the images so as to remove all features other than the handwritten characters. This may involve a person editing the image to remove the other features. Additionally or alternatively, automated de-noising and other processes may be applied to the image to remove the other features, and the processed image confirmed by a person, to ensure that only handwritten characters remain in the image. For example, various de-noising processes may be applied, and then a person may manually remove any remaining features which are not handwritten text (including machine written text, lines etc).

Figure 15A:
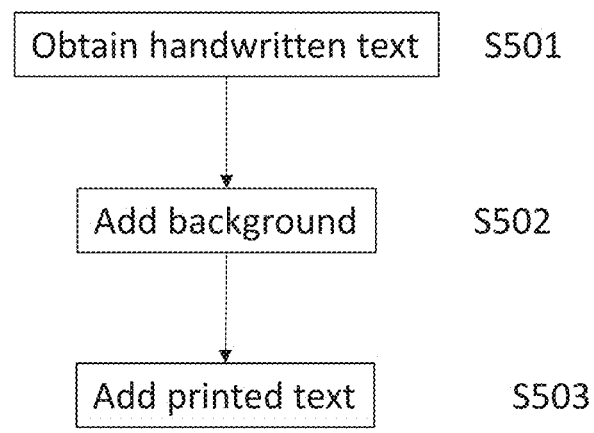
FIG. 15(a) is a schematic illustration of a method of obtaining a set of training data.

In this example, the corpus of training data comprises synthetically generated data. An example process of generating the second set of data will now be described in relation to FIG. 15(*a*). Although an example is described here in which only synthetic training data is used, training data may be obtained from various sources and using various different methods. For example, only synthetic data may be used, or only real world data may be used, or a combination of synthetic data and real world data may be used to train the model. In this example, a training data set comprising synthetic data is used, and a test data set comprising real world data is used.

Using a first model 40 which takes binary images as input means there is less variation in the images, and therefore the synthetically generated data can more easily represent the real data.

Furthermore, the synthetically generated data can be generated to replicate distributions found in the real world test data set for example.

In S501, a number of examples of artificially generated handwritten text are obtained. The input to this step may comprise a text file, comprising a list of entries, each entry comprising text and corresponding to a training example. The text may comprise randomly generated words. The content of the text may correspond to words or characters that are used in the test set of real world data, words or characters that are similar to those used in the test set of real world data for example, manually inputted words, randomly generated words, or a combination of these.

The artificial handwritten text is generated from these text entries in S501. Each entry in the text file is converted to a font from a set of fonts which are selected as being similar to handwriting. For example, fonts such as "Bradley Hand Itc" or "Freestyle script" resemble handwriting, whereas fonts such as "Arial" or "Times New Roman" do not. Different fonts and font sizes are used for different entries, to represent different styles of handwriting. The fonts and font sizes may be applied so as to match a distribution taken from the test set of real world data. For example, a mean and standard deviation of text size may be taken from the test set, and the synthetic data generated having a normal distribution of font size with the same mean and standard deviation. Alternatively, a maximum and minimum character size may be determined, for example from the test set of real world data, and each image generated in S501 is generated having a randomly selected size within the range.

For different images, the text may be included at different positions within the image, or split across different lines for example. These modifications may be made across the second set so as to match a distribution or range found in the test set.

In this step, various modifications are also made to the images, such as shearing, translations and rotations for example. Again, these modifications may be made across the second set so as to match a distribution found in the test set. A binarisation step may be applied after this step, since modifications such as shearing may result in a grayscale image.

Although a method of artificially generating handwritten text has been described here, alternatively, images of real handwriting may simply be obtained in this step.

The images generated or obtained in S501 are also stored. These images are then used as the expected output of the first model 41 during the training process of the first model 41.

In S502, artificial background features are added to each image. In this step, noise is added to each of the images generated in S502.

A first function (blank_image) is executed which creates a blank image of a given background color and size. The background colour is selected randomly for each image from a given range of colours. The image is generated to be a standard size. The handwritten text generated in S501 is then added to this image, in the location determined in S501.

A second function (texture) is executed which takes the image output from the first function and adds noise patterns to the image. The noise patterns are generated based on a first parameter "sigma1", which sets the bounds of noise fluctuations, and which is selected randomly for each image from within a given range. The ranges may be determined by taking a maximum and minimum value from the test set for example. A second parameter "turbulence" is also used by the second function to define how quickly larger patterns will be replaced with the smaller ones. The value of this parameter may be pre-determined, for example based on the test set. The lower the value, the more iterations will be performed during texture generation.

A third function (add_noise) is then executed, which takes the image output from the second function and which adds noise to this image. The third function calls a fourth function (noise), which generates an image filled with Gaussian nose. If a ratio parameter is specified, noise will be generated for a smaller size image and then it will be upscaled to the desired size. In this case, the noise will generate larger square patterns. To avoid multiple lines, the upscale uses interpolation. A third parameter "sigma2" defines the bounds of the noise fluctuations, and is selected randomly from within a given range. The range may be determined by taking a maximum and minimum value from the test set for example.

A fifth function (draw_random_lines) is then executed, which takes the image output from the third function and which adds random lines to the image, based on one or more parameters. The parameters may include a fourth parameter "number_of_lines" which sets the number of lines included in the image, and may be selected randomly for each image from within a given range. The parameters may include a fifth parameter "line_width_max" which sets the width of the lines included in the image, and may be selected randomly for each image from within a given range. The parameters may include a sixth parameter "line_color" which sets the color of the lines included in the image, and may be selected randomly for each image from within a given range. The ranges may be determined by taking a maximum and minimum value from the test set for example.

A sixth function (seq) is then executed, which takes the image output from the fifth function, which applies various image processing augmentations, including normalisation and blur for example. The augmentations are applied based on one or more further parameters which are selected randomly for each image from within a given range.

In S503, machine written text is generated and added to the image output from S502. The input to this step may comprise a second text file, comprising a list of entries, each entry comprising text and corresponding to a training example. The content of the text may correspond to words or characters that are used in the test set of real world data, words or characters that are similar to those used in the test set of real world data for example, manually inputted words, randomly generated words, or a combination of these.

The machine written text is generated from these text entries in S501. Each entry in the text file is converted to a font which is not similar to handwriting. For example, fonts such as "Bradley Hand Itc" or "Freestyle script" resemble handwriting and so are not used in this step, whereas fonts such as "Anal" or "Times New Roman" do not resemble handwriting and therefore may be used in this step. For example, a font from a set of fonts which are selected as being similar to those used for the machine written text in the test set may be used for example. Different fonts and font sizes may again be used for different entries. The fonts and font sizes may be applied so as to match a distribution taken from the test set of real world data. For example, a maximum and minimum character size may be determined from the test set of real world data, and each image generated having a randomly selected size within the range.

For different images, the text may be included at different positions within the image, or split across different lines for example. These modifications may be made across the second set so as to match a distribution found in the test et. The machine written text is added to the images output from S502.

The images are binarised prior to training of the first model 40. The images may be binarised in the same manner as described previously.

Figure 15B:
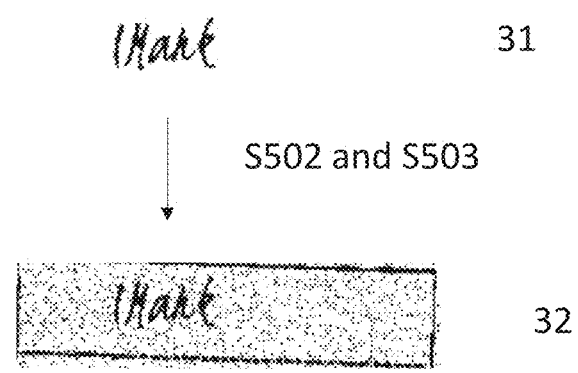
FIG. 15(b) shows an example of an image of characters and a training example image which are generated fin the method of FIG. 15(a)

FIG. 15(b) shows an example of an image of handwritten characters 31 which is obtained in S501 and a training example image 32 which is generated from the image of handwritten characters by applying steps S502 and S503 as described above. The training example image 32 output from S503 is taken as input to the first model 40 in a method of training the first model according to an embodiment, which will be described below in relation to FIG. 16(a). The image of handwritten characters 31 is used as the expected output of the first model 40 in the method of training the first model described below.

Figure 16A:
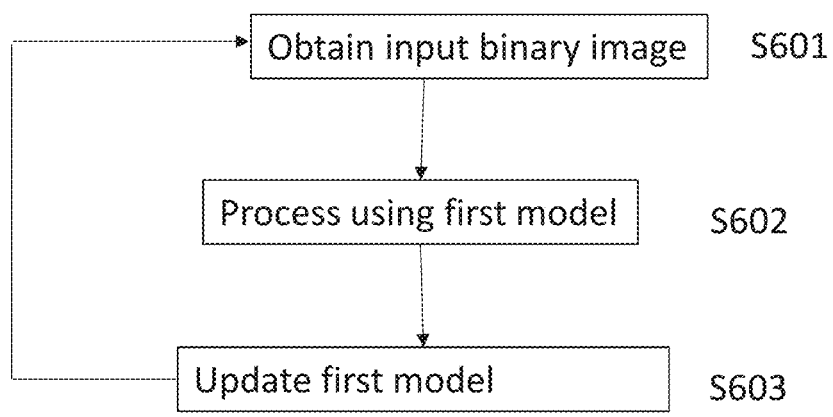
FIG. 16(a) shows a method of training a first model in accordance with an embodiment.
Figure 16B:
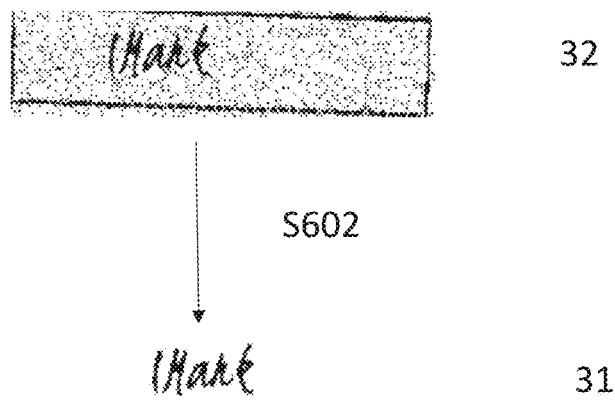
FIG. 16(b) shows an example image which is input to the first model and an example image which is output from the first model in the method of FIG. 16(a)

FIG. 16(a) shows a method of training a first model 40 in accordance with an embodiment. The method may be performed to train a first model 40 which is then used in a method of processing an image such as described in FIG. 2(a) or FIG. 2(b) above. The models described above in relation to FIGS. 5, 6(a), 9, 10, 11 and 12(a) may be trained according to the method described in relation to FIG. 16(a) for example.

In S661, an input training image is obtained. The input training image may be a training example image 32 output from the method described in relation to FIG. 15(a) for example. Alternatively it may be a real image.

The image is taken as input to a modified first model 40. This is referred to as the "forward pass". The modified first model 40 corresponds to the first model which is to be used in a method of processing an image, with a dropout layer 33 included between the encoder section 41 and the decoder section 42.

Figure 16C:
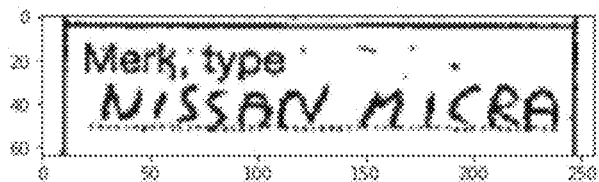
FIG. 16(c) shows an example image which is input to the first model and example images which are output from the first model in the method of FIG. 16(a)
Figure 16C:
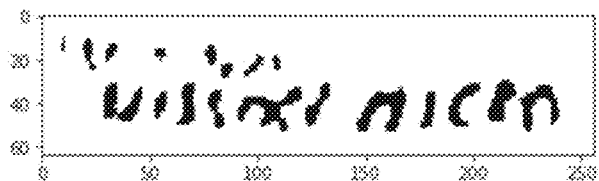
Figure 16C:
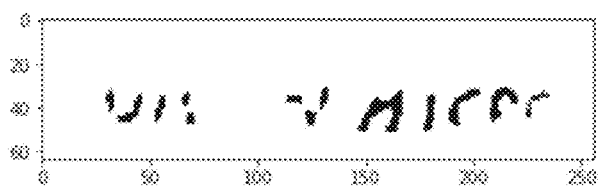
Figure 16C:
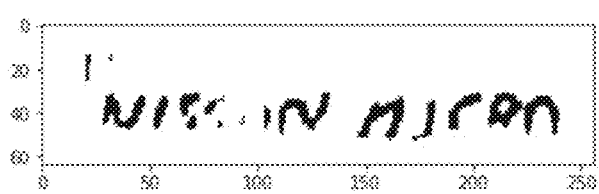
Figure 16C:
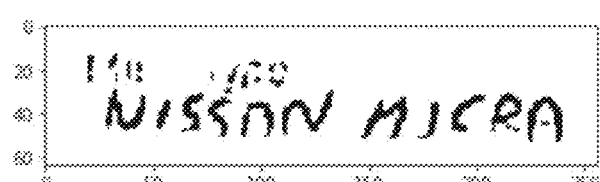
Figure 16C:
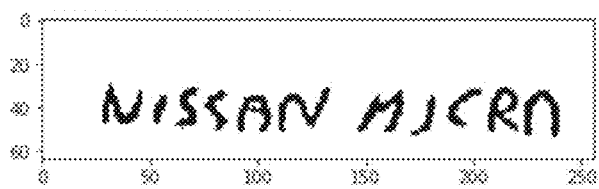
Figure 16D:
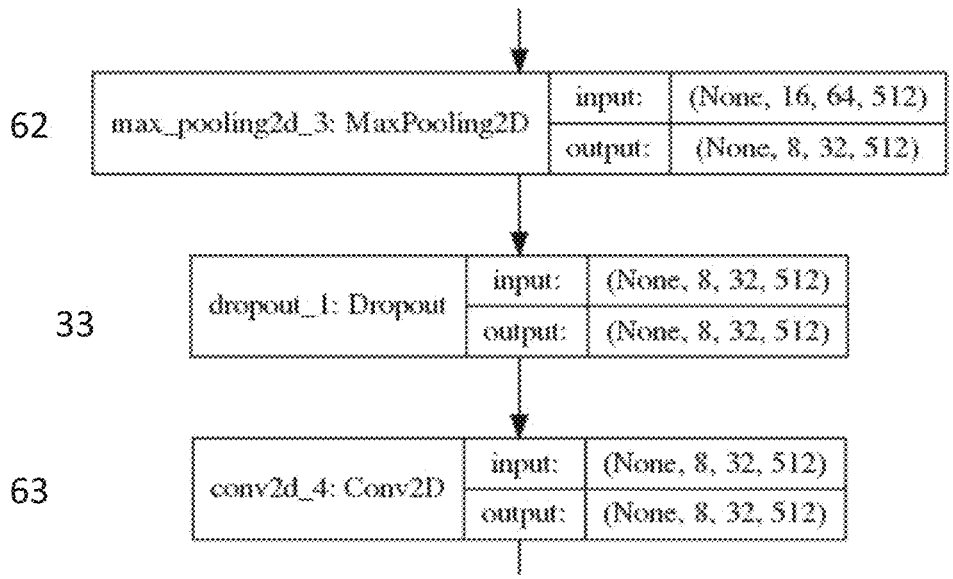
FIG. 16(d) is a schematic illustration of a part of a first model including a dropout layer which is used in a method of training a first model in accordance with an embodiment.

FIG. 16(d) shows a dropout layer 33 included between the encoder section 41 and the decoder section 42 of the first model 40 described in relation to FIGS. 5 and 6(a) above. As described in relation to FIG. 5 above, the encoder section 41 comprises a third pooling layer 62 which takes an input size 16×64×512 and performs max pooling to output data of size 8×32×512. This output data is taken as input to the dropout layer 33. The dropout layer 33 takes an input size 8×32×512 and outputs data of size 8×32×512. The output of the dropout layer 33 is taken as input to the fourth convolutional layer 63, which is described previously.

During the forward pass, the dropout layer 33 takes the output of the third pooling layer 62 as input values and randomly sets some of these values to 0, with a rate r. The value as r is a hyperparameter having a value greater than or equal to 0 and less than or equal to 1. In other words, inputs to the fourth convolutional layer 63 are set to zero with probability r. Values which are not set to 0 are scaled up by $1/(1-r)$. The dropout layer may be implemented by element-wise multiplication of the output of the third pooling layer 62 with a mask matrix of values comprising zeros (where if r=0.5, then half the values in the mask matrix are set to 0 for example), with $1/(1-r)$ set as the value for the remaining entries in the mask matrix. For each example, the values which are set to zero are randomly distributed through the matrix, so that the zeros are distributed differently for each mask matrix applied. The mask matrix for each input is also stored for use during the backward pass (described below). In an embodiment, r is greater than or equal to 0 and less than 0.6. In a further embodiment, r is greater than or equal to 0.2 and less than 0.6. In a further embodiment, r is greater than or equal to 0.4 and less than or equal to 0.55. In a further embodiment, r is equal to 0.5.

Inclusion of the dropout layer 33 may reduce overfitting and improve generalisation of the first model 40. This may be helpful where the first model 40 is trained on a small dataset, or when it is trained on synthetic data for example. In particular, when the first model 40 is trained on synthetic data, the synthetic data comprises machine generated characters that resemble handwritten characters. These are labelled as handwritten characters. The first model 40 is trained to distinguish between machine generated characters that resemble handwritten characters (and are labelled as handwritten characters) and machine generated characters that do not resemble handwritten characters (and are labelled as not handwritten characters). The differences between machine generated characters which are labelled as handwritten characters and machine generated characters which are labelled as not handwritten characters can be small. Small variations in each training image can lead to large changes to the model parameters during the update, meaning that it is difficult to converge to a set of parameters during training. Using a dropout layer can reduce overfitting, and force the model to focus on key features common to all characters which resemble handwritten characters. Furthermore, since the first model does not comprise any skip connections over the dropout layer, data travels between the encoder and the decoder only through dropout layer, forcing the encoder to learn the key features that identify characters resembling handwritten characters.

Figure 16E:
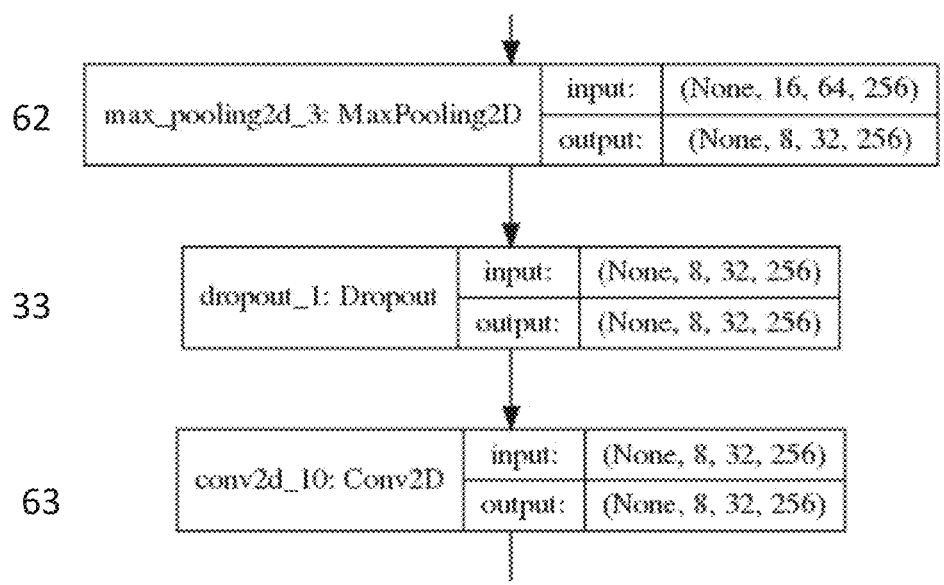
FIG. 16(e) is a schematic illustration of a part of the first model including a dropout layer which is used in a method of training a first model in accordance with an embodiment.

FIG. 16(e) shows a dropout layer 33 included between the encoder section 41 and the decoder section 42 of the first model 40 described in relation to FIGS. 9, 10, 11 and 12 above. As described in relation to FIG. 10 above, the encoder section 41 comprises a third pooling layer 62 which takes an input size 16×64×256 and performs max pooling to output data of size 8×32×256. This output data is taken as input to the dropout layer 33. The dropout layer 33 takes an input size 8×32×256 and outputs data of size 8×32×256. The output of the dropout layer 33 is taken as input to the fourth convolutional layer 63, which is described previously.

The dropout rate r takes a value greater than or equal to 0 and less than or equal to 1. In an embodiment, r is greater than or equal to 0 and less than 0.6. In a further embodiment, r is greater than or equal to 0.2 and less than 0.6. In a further embodiment, r is greater than or equal to 0.4 and less than or equal to 0.55. In a further embodiment, r is equal to 0.5. Including a dropout layer 33 between the encoder section 41 and the decoder section 42 forces the encoder section 41 to focus on the key features. For example, it is found that including the dropout layer 33 within the encoder section 41 can result in the first model 41 focusing on minor features which are relevant for some training images but not others. Including the dropout layer 33 after the encoder section 41 forces the first model 41 to learn important features. The dropout layer 33 mitigates cases where the first model 40 is stuck in a local minimum during the training process.

The dropout layer 33 discards some of the inputs to the decoder section 42, by setting these inputs to zero. The discarded inputs are randomly selected for each training example. The dropout layer 33 effectively reduces the dimension of the data output from the encoder section 41 and inputting to the decoder section 42, by setting some of the data values to zero. As has been described previously, the encoder section 41 increases the size of the data. Since the size of the data inputted to the decoder section 42 is larger, a dropout layer 33 can be included at this point, whilst still allowing sufficient data to be passed from the encoder section 41 to the decoder section 42.

The first model according to the second embodiment was also tested using a number of input images as described previously, again using the same binarisation process and OCR process, but using different dropout rates. The results are shown below:

TABLE 3

Example results of second embodiment with varying dropout rate

| Dropout | Accuracy | Levenshtein Distance | Prediction Examples | Prediction Distances |
|---|---|---|---|---|
| 0.0 | 79 | 0.225 | alfa romeo | 0.0 |
| | | | corpo y | 0.14 |
| | | | bmw 318 | 0.0 |
| | | | augi #5 | 0.29 |

TABLE 3-continued

Example results of second embodiment with varying dropout rate

| Dropout | Accuracy | Levenshtein Distance | Prediction Examples | Prediction Distances |
|---|---|---|---|---|
| 0.2 | 81 | 0.230 | ala romeo | 0.1 |
|  |  |  | corpoy | 0.29 |
|  |  |  | bmw 318 | 0.0 |
|  |  |  | audi as | 0.29 |
| 0.5 | 82 | 0.218 | alaromeo | 0.2 |
|  |  |  | corpo y | 0.14 |
|  |  |  | bmw 318 | 0.0 |
|  |  |  | quai a5 | 0.14 |
| 0.6 | 75 | 0.282 | alaromeo | 0.2 |
|  |  |  | corpo y | 0.14 |
|  |  |  | bmw bay | 0.43 |
|  |  |  | dual 65 | 0.43 |
| 0.7 | 70 | 0.314 | alaromeo | 0.2 |
|  |  |  | corpo y | 0.14 |
|  |  |  | bmw bay | 0.43 |
|  |  |  | quai as | 0.29 |

In these examples, by including a dropout layer between the encoder section and decoder section of the first model, higher accuracies and lower Levenshtein distances can be obtained in the following recognition step. Table 3 shows the results for input images corresponding to the text: alfa romeo; corpo 4; brim 318; and audi a5. Table 3 shows the tested dropout values 0.0, 0.2, 0.5, 0.6 and 0.7, including the accuracy and Levenshtein distance. The highest accuracy and lowest Levenshtein distance was achieved by including a dropout layer with 0.5 rate. This balances the model capacity with normalization. An increase in performance is seen from 0.0 up to 0.5 dropout rate, and after that a decrease in performance up to 0.7 dropout rate.

The modified first model 40 takes the training example image as input and outputs an image in the same manner as has been described previously, with the addition of the dropout layer 33.

As has been described previously, skip connections may be included in the first model 40. The skip connections provides an alternative path for the gradient during back-propagation, and can stabilize gradient updates during training as well as allowing for re-usability of features. Skip connections are not included crossing over the dropout layer 33. By including skip connections only either side of the dropout layer 33, the model can be trained to recognise nuances in the input data, and in particular to distinguish handwritten characters from machine written characters for example. In particular, skip connections may be included before or after the dropout layer 33, but not over the dropout layer 33, meaning that the dropout layer 33 is able to function to force the first model 41 to focus on the key features in the input image data. By including skip connections within the encoder 41 and within the decoder 42, but not crossing from the encoder 41 to the decoder 42, the encoder is able to learn to identify the handwritten text separately from the decoder 42. The skip connection also provides an alternative path for the gradient during back-propagation, and can stabilize gradient updates during training as well as allowing for re-usability of features.

An expected output image is then compared with the actual output image from the modified first model 40, in order to update the trainable parameters of the modified first model 40. In this example, the expected output image is that obtained in S501 of the method described in FIG. 15(*a*), in other words the image of the handwritten characters 31.

The first model comprises a number of trainable parameters, which can be expressed as a vector θ. The parameters include the filter weights for all of the convolutional layers. The update process searches for a parameter vector θ so that the difference between the actual output image and the expected output image is minimised.

The parameters are determined by assigning random values as θ initially and then updating θ sequentially by computing the gradient of a loss function $\partial L/\partial \theta$ and updating θ using the computed gradient and an optimiser function.

L represents a loss function. A binary cross entropy loss may be used, in which:

$$L = \frac{1}{N} \sum_{i=1}^{N} y_i \log \hat{y}_i + (1 - y_i) \log(1 - \hat{y}_i)$$

Where N is the number of pixels in the output image (the same as the number of pixels in the input image in this case), $y_i$ is the expected output value for the pixel (the target or ideal output, taken from the image of handwritten characters 31) and $\hat{y}_i$ is the actual value output from the first model 40 for the pixel. In this example, the value of $y_i$ will be 0 if the pixel corresponds to a handwritten character and 1 if it does not.

The gradient of the loss L with respect to each of the trainable parameters of the model is determined through back-propagation. This is referred to as "the backward pass". During the backward pass, the same mask matrix applied for the input example for the forward pass is used.

The gradients are then used to determine the updated parameters, using an optimiser function. This family of update methods is known as gradient descent (GD), generally defined iteratively as:

$$\theta = \theta - \mu \frac{\partial D}{\partial \theta}$$

where μ is the learning rate, which defines how quickly the parameters are updated. An Adam optimization algorithm may be used for example.

The update may be performed in batches of input images, based on a batch average. A batch size of 150 may be used for example.

The model performance may be tested using a test data set comprising real world examples. The test data set comprises a set of real world binarised images, in other words images comprising text written by a person. For each image, the test data set also comprises a corresponding image in which the handwritten text is isolated. These are the expected output images used to generate the loss. The expected output images may be obtained by applying various editing processes to the real world images so as to remove all features other than the handwritten characters. This may involve a person editing the image to remove the other features. Additionally or alternatively, automated de-noising and other processes may be applied to the image to remove the other features, and the processed image confirmed by a person, to ensure that only handwritten characters remain in the image. For example, various de-noising processes may be applied, and then a person may manually remove any remaining features which are not handwritten text (including machine written text, lines etc). A real world binarised image is then inputted to the model, and a loss calculated using the corresponding expected output image. This may be repeated for multiple images in the test set, and an average value of the loss used to determine if the model performance is adequate. If the model performance is not deemed to be adequate, then additional training is performed. This may involve generating additional synthetic data for example.

The first model 40 is trained to isolate the handwritten characters in the input binary image. FIG. 16(c) shows an example input image at the top of the figure. The subsequent figures show the output of the first model 40 at different stages in the training process. As can be seen, once trained, the first model 40 outputs a binary processed image, which contains the handwritten characters. The machine written characters, lines and other features are removed. Once trained, the first model 40 is used in the method of FIG. 2 described above, without the dropout layer.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A computer-implemented method of processing an image, comprising:
   obtaining an input image;
   converting the input image into a binary image;
   processing the binary image using a trained model that performs classification of image components as part of a character, wherein the model comprises a first section and a second section, wherein the binary image is inputted to the first section, wherein the first section comprises a first set of convolutional layers and wherein the second section comprises a second set of convolutional layers, wherein the first set of convolutional layers comprises an increasing number of filters and wherein the second set of convolutional layers comprises a decreasing number of filters.

2. The method according to claim 1, further comprising performing optical character recognition using the processed binary image.

3. The method according to claim 2, wherein the trained model is a first trained model and wherein the optical character recognition uses a second trained model, wherein the second trained model comprises one or more convolutional layers.

4. The method according to claim 1, wherein the trained model generates a processed binary image in which each pixel is classified as part of a handwritten character or not part of a handwritten character.

5. The method according to claim 1, wherein the size of the data output from the first section is greater than the size of the binary image data.

6. The method according to claim 1, wherein the model further comprises one or more skip connections within the first section and/or one or more skip connections within the second section.

7. A non-transitory computer readable storage medium comprising computer readable code configured to cause a computer to perform the method of claim 1.

8. A system, comprising one or more processors configured to:
   obtain an input image;
   convert the input image into a binary image;
   process the binary image using a trained model that is configured to perform classification of image components as part of a character, wherein the model comprises a first section and a second section, wherein the binary image is inputted to the first section, wherein the first section comprises a first set of convolutional layers and wherein the second section comprises a second set of convolutional layers, wherein the first set of convolutional layers comprises an increasing number of filters and wherein the second set of convolutional layers comprises a decreasing number of filters.

9. A computer-implemented method of training a model, the method comprising:
   obtaining an input binary image;
   processing the binary image using a model that performs classification of image components as part of a character, wherein the model comprises a first section and a second section, wherein the input binary image is inputted to the first section, wherein the first section comprises a first set of convolutional layers and wherein and wherein the second section comprises a second set of convolutional layers, wherein the first set of convolutional layers comprises an increasing number of filters and wherein the second set of convolutional layers comprises a decreasing number of filters;
   updating one or more parameters of the model based on a target image in which the image components are indicated as part of a character or not part of a character.

10. The method according to claim 9, wherein the model generates a processed binary image in which each pixel is classified as part of a handwritten character or not part of a handwritten character.

11. The method according to claim 9, wherein the size of the data output from the first section is greater than the size of the input binary image data.

12. The method according to claim 9, wherein the model further comprises a dropout layer between the first section and the second section.

13. The method according to claim 9, wherein the model further comprises one or more skip connections within the first section and/or one or more skip connections within the second section.

14. The method according to claim 13, wherein none of the skip connections connect between the first section and the second section.

15. The method according to claim 9, wherein obtaining the input binary image comprises processing the target image to add one or more of the following features: noise, machine written text and lines.

16. A computer implemented method of processing an image, comprising:
   obtaining an input image;
   converting the input image into a binary image;
   processing the binary image using a model, wherein the model is trained according to the method of claim 9.

17. A system, comprising a model trained according to the method of claim 9.

18. A non-transitory computer readable storage medium comprising computer readable code configured to cause a computer to perform the method of claim 9.

* * * * *